US006775824B1

(12) United States Patent
Osborne, II et al.

(10) Patent No.: US 6,775,824 B1
(45) Date of Patent: Aug. 10, 2004

(54) METHOD AND SYSTEM FOR SOFTWARE OBJECT TESTING

(75) Inventors: Theodore M. Osborne, II, Burlington, MA (US); Michael V. Glik, Newton, MA (US); Walter G. Vahey, Winchester, MA (US); Caren H. Baker, Waltham, MA (US); George Friedman, Framingham, MA (US)

(73) Assignee: Empirix Inc., Waltham, MA (US)

( * ) Notice: Subject to any disclaimer, the term of this patent is extended or adjusted under 35 U.S.C. 154(b) by 0 days.

(21) Appl. No.: 09/481,151

(22) Filed: Jan. 12, 2000

(51) Int. Cl.[7] ................................................ G06F 9/44
(52) U.S. Cl. ...................... 717/125; 714/46; 714/703; 714/738
(58) Field of Search ...................... 717/107, 124–130; 714/38, 46, 703, 738

(56) References Cited

U.S. PATENT DOCUMENTS

| | | | |
|---|---|---|---|
| 4,617,663 A | 10/1986 | Lake et al. | |
| 5,359,546 A | 10/1994 | Hayes et al. | |
| 5,371,883 A | 12/1994 | Gross et al. | |
| 5,537,560 A | 7/1996 | Boggs et al. | |
| 5,671,351 A | 9/1997 | Wild et al. | |
| 5,812,780 A | 9/1998 | Chen et al. | |
| 5,841,670 A | 11/1998 | Swoboda | |
| 5,881,269 A | 3/1999 | Dobbelstein | |
| 5,974,572 A | 10/1999 | Weinberg et al. | |
| 6,002,869 A * | 12/1999 | Hinckley | 717/124 |
| 6,002,871 A | 12/1999 | Duggan et al. | |
| 6,182,245 B1 | 1/2001 | Akin et al. | |
| 6,209,125 B1 | 3/2001 | Hamilton et al. | |
| 6,226,788 B1 * | 5/2001 | Schoening et al. | 717/106 |
| 6,237,135 B1 * | 5/2001 | Timbol | 717/107 |
| 6,256,773 B1 * | 7/2001 | Bowman-Amuah | 717/107 |
| 6,289,046 B1 | 9/2001 | Bryant | |
| 6,298,478 B1 | 10/2001 | Nally et al. | |
| 6,397,378 B1 * | 5/2002 | Grey et al. | 717/124 |
| 6,401,220 B1 * | 6/2002 | Grey et al. | 714/33 |
| 6,446,120 B1 | 9/2002 | Dantressangle | |
| 6,473,794 B1 | 10/2002 | Guheen et al. | |
| 6,510,402 B1 | 1/2003 | Logan et al. | |
| 6,523,027 B1 | 2/2003 | Underwood | |
| 6,574,578 B1 | 6/2003 | Logan | |

OTHER PUBLICATIONS

The Bean Box: Sun's JavaBeans test container, www.google.com Mark, Johnson published 1997.*

Berg; "The State of Java Application Middleware, Part 1;" Java World Fueling Innovation; Mar. 1999; pp. 1–19.

Goldsmith et al.; "Exploiting Enterprise JavaBeans in the NIIIP Virtual Enterprise;" 1998 IEEE; 0–7803–5060–X/98; pp. 124–135.

Hemrajani; "The State of Java Middleware, Part 2: Enterprise JavaBeans;" Java World Fueling Innovation; Apr. 1999; pp. 1–24.

(List continued on next page.)

Primary Examiner—Wei Y. Zhen
Assistant Examiner—Chuck Kendall
(74) Attorney, Agent, or Firm—Chapin & Huang, L.L.C.; David W. Rouille

(57) ABSTRACT

A system for testing middleware of applications in the N-tiered model. The test system contains test code generators, test engines to execute multiple copies of the test code and a data analyzer to analyze and present the results to a human user. The system is able to automatically generate test code to exercise components of the middleware using information about these components that would otherwise be available to the application under test. Multiple copies of the test code are executed in a synchronized fashion. Execution times of multiple events are recorded and then presented in one of several formats. With the system, an application developer can identify components that represent performance bottlenecks or can gather information on deployment properties of individual components that can be used to enhance the performance of the application under test.

9 Claims, 14 Drawing Sheets

OTHER PUBLICATIONS

Lewandowski; "Frameworks for Component–Based Client/Server Computing;" ACM Computing Survey, vol. 30, No. 1, Mar. 1998; pp. 3–27.

Nolan; "A Look at e–Test Suite 3.1 by RSW;" Software Testing & Quality Engineering; Jul./Aug. 1999; www.stqemagazine.com; 2 pages.

Ritter; "The Middleware Muddle;" SIGMOD Record, vol. 17, No. 4, Dec. 1998; pp. 86–93.

Sundstead; "Zip Your Data and Improve The Performance of Your Network–Based Applications;" Java World Fueling Innovation; Nov. 1998; pp. 1–9.

"Mercury Interactive Announces Load Testing Support for BEA Jolt Web–Based Applications;" Business Wire; New York; Dec. 7, 1998; Business Editors/Computer and Technology Writers; pp. 1–3.

"Mercury Interactive TestSuite Enterprise;" 1999 ComputerWire PLC; Jun. 1999; Distributed Systems Management Tools Bulletin; Section 5: Business Systems Management Tools; pp. 5621–5627.

\* cited by examiner

METHOD AND SYSTEM FOR SOFTWARE OBJECT TESTING

This invention relates generally to computer software applications and more specifically to testing computer software applications.

Distributed computing has been used for many years. Distributed computing is very prevalently used in "enterprise-wide" applications. An enterprise-wide application is an application that allows a large group of people to work together on a common task. Usually, an enterprise-wide application performs functions that are essential to a company's business. For example, in a bank, people at every bank branch must be able to access a database of accounts for every bank customer. Likewise, at an insurance company, people all over the company must be able to access a database containing information about every policyholder. The software that performs these functions is generally known as enterprise-wide applications.

As available hardware and software has evolved, the architecture of enterprise wide applications has changed. An architecture which is currently popular is called the N-Tier enterprise model. The most prevalent N-tier enterprise model is a three tier model. The three tiers are the front end, the middleware and the back end. The back end is the database. The front end is sometimes referred to as a "client" or a Graphical User Interface (GUI). The middleware is the software that manages interactions with the database and captures the "business logic." Business logic tells the system how to validate, process and report on the data in a fashion that is useful for the people in the enterprise.

The middleware resides on a computer called a server. The database might be on the same computer or a different computer. The "client" is usually on an individual's personal computer. All of the computers are connected together through a network. Because many people use the enterprise wide application, such systems are set up to allow simultaneous users and there would be many clients connected to a single server. Often, many clients will be connected to the server simultaneously.

Those familiar with internet commerce will recognize that the N-tiered model also describes many internet web sites that sell goods or services. For example, a web site that auctions cars is likely to fit the N-tiered model. In such an application, databases are provided to track buyers, sellers and objects being auctioned. Also, a database must be provided to track the bids as they are entered. The middleware provides the access to these databases and encapsulates the business logic around such transactions as when to accept a bid, when to declare an item sold, etc. In the world of distributed computing, it makes no difference whether the "clients" using the application are employees of a single company or many Internet users throughout the world. Herein, examples of applications under test will be given, but they are not intended to imply limitations on the use of the invention. The inventions described herein could be used by developers of enterprise-wide applications or web based applications.

One advancement in the N-tiered model is that the middleware is very likely to be componentized and is very likely to be written to a component standard so that it will easily integrate with software at other tiers. Enterprise JavaBeans (EJB) by Sun Microsystems, COM, DCOM and COM+ by Microsoft Corporation and CORBA by IBM are examples of component specification standards that are commercially available. Herein, EJB is used as an example of a component standard used to implement middleware in an N-tiered model, but it should be appreciated that and the concepts described herein could be used with other component standards.

EJBs are written in the JAVA language, which is intended to be "platform independent." Platform independent means that an application is intended to perform the same regardless of the hardware and operating system on which it is operating. Platform independence is achieved through the use of a "container." A container is software that is designed for a specific platform. It provides a standardized environment that ensures the application written in the platform independent language operates correctly. The container is usually commercially available software and the application developer will buy the container rather create it.

Componentized software is software that is designed to allow different pieces of the application, or "objects", to be created separately but still to have the objects work together. For this to happen, the objects must have standard interfaces that can be understood and accessed by other objects. Some parts of these interfaces are enforced by the software language. If the interfaces are not used, the software objects will not be able to work with other objects. Other practices are imposed by convention. Usually, one company has "control" over the language and specifies programming practices that should be followed by anyone writing platform independent software in that language. Because these programming practices are known to everyone, the companies that create the containers can rely on them when creating the container. As a result, if these practices are not followed, the container might not operate properly. Thus, there is an indirect mechanism for enforcing these practices.

Typically, applications have been tested in one of two ways. The objects are tested as they are written. Each is tested to ensure that it performs the intended function. When the objects are assembled into a completed application, the entire application is then usually tested. Heretofore, application testing has generally been done by applying test inputs at the client end and observing the response of the application. There are several shortcomings with this process. One is that it is relatively labor intensive. particularly to develop a load or scalability test. There has been no easy way to create the test program, instantiate it with test data, execute the test and aggregate the results.

Some tools, called "profilers," have been available. However, these tools track things such as disk usage, memory usage or thread usage of the application under test. They do not provide data about performance of the application based on load.

Other tools are available to automate the execution of tests on applications. For example, RSW Software, Inc. of Waltham, Mass., provides a product called e-Load. This tool simulates load on an application under test and provides information about the performance of the application. However, this tool does not provide information about the components in an application. We have recognized that a software developer would find such information very useful.

Automatic test generation tools, such as TestMaster available from Teradyne Software and System Test of Nashua, N.H., are also available. Tools of this type provide a means to reduce the manual effort of generating a test. TestMaster works from a state model of the application under test. Such an application is very useful for generating functional tests during the development of an application. Once the model of the application is specified, TestMaster can be instructed to generate a suite of tests that can be tailored for a particular task—such as to fully exercise some portion of the application that has been changed. Model based testing is particularly useful for functional testing of large applications, but is not fully automatic because it requires the creation of a state model of the application being tested.

We have recognized that a second shortcoming of testing enterprise wide applications is the critical performance criteria to measure often relates to how the application behaves as the number of simultaneous users increases. There are examples of websites crashing or operating so slow as to frustrate an ordinary user when too many users log on simultaneously. In the past, load has been simulated informally, such as by having several people try to use the application at the same time. Some tools exist to provide a load on an application for testing, such as e-Load available from RSW of Waltham, Mass.

However, it has generally not been until the application is deployed into its intended operating environment that the performance of the application under load is known. Thus, the biggest problem facing an application developer might not be testing to see whether each object performs as designed or even whether the objects work together as a system. Heretofore there has been no available tool that will help an application developer ascertain how many simultaneous users a middleware application can accommodate given a specified transaction response time or identify which object in the application, given real world load conditions, is causing the bottleneck.

SUMMARY OF THE INVENTION

With the foregoing background in mind, it is an object of the invention to provide testing tools to facilitate load based testing of N-tiered applications.

It is also an object to provide automatic testing.

The foregoing and other objects are achieved by a test system that generates test code for components of an application under test using interface information about the components.

In the preferred embodiment, the generated test code simulates use of a particular software object within an application by a plurality of simultaneous users. The number of simultaneous users simulated is varied.

In a presently preferred embodiments, the test code is generated from interface information for the object under test, which identifies methods of the object. Ranges and formats for data values for the inputs and outputs of the methods are determined from properties specified in the interface information. Specific data values are generated from user supplied tables or using algorithms to pick allowable values within the range.

BRIEF DESCRIPTION OF THE DRAWINGS

The invention will be better understood by reference to the following more detailed description and accompanying drawings in which.

DESCRIPTION OF THE PREFERRED EMBODIMENT

Figure 1:
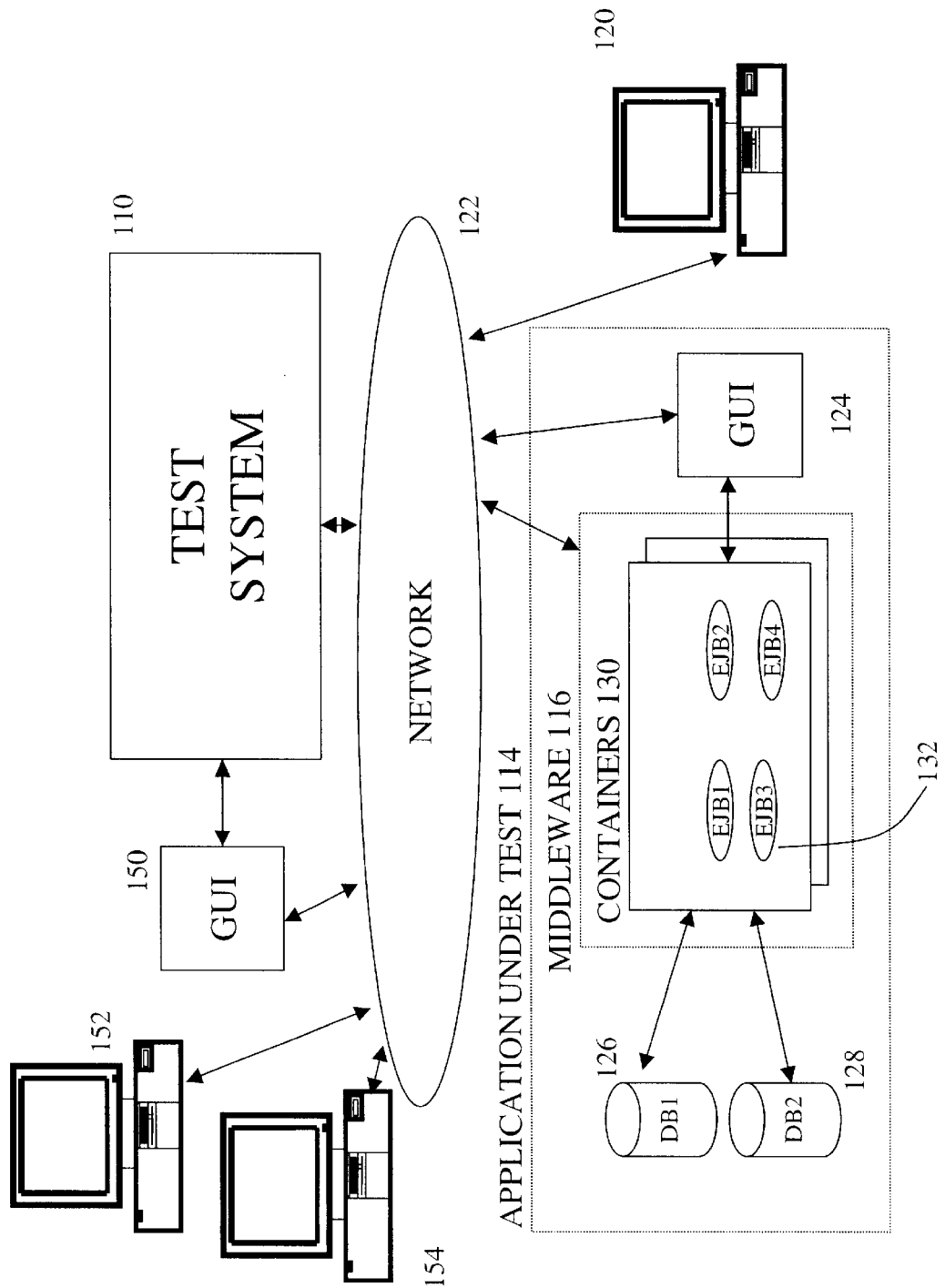
FIG. 1 is an illustration of an application under test by the test system of the invention.

FIG. 1 illustrates a test system 110 according to the present invention. The system is testing application under test 114. Here application under test 114 is an application in the N-tiered model. More specifically, it is a three tiered database application. Application under test 114 could represent a database for a bank or an insurance company or it could represent an Internet application. The specific function of application under test 114 are not important to the invention.

Also, the specific hardware on which test system 110 and the application under test 114 reside is not important to the invention. It is sufficient if there is some connection between the two. In the illustration, that connection is provided by network 122. In the illustrated embodiment, it is contemplated that network 122 is part of a LAN operated by the owner of application under test 114, such as an Ethernet network. In this scenario, test system 110 is installed on a server within the LAN. However, many other implementations are possible. For example, network 122 could be a WAN owned by the owner of application under test 114.

A further variation is that network 122 could the Internet. In that scenario, test system 110 could be located in a server owned by a testing company.

A further possibility is that test system and application under test could be located in computers owned by a testing company. Many applications are written using platform independent technology such that the application will perform the same on many different platforms. Platform independent technology is intended to make it easy to run an application on any platform. Therefore, the application under test could be sent to a testing company, owning the hardware to implement test system 110, such as by uploading over the Internet. Thereafter, the application under test could be tested as described herein while running on a platform provided by the testing company with the results of the test being downloaded over the Internet.

Still other variations are possible. Test system 110 and application under test 114 could physically be implemented in the same computer. However, that implementation is not presently preferred because a single computer would have to be very large or would be limited in the size of applications that could be tested. The presently preferred embodiment uses several computers to implement test system 110.

Application under test 114 is a software application as known in the art. It includes middleware 116 that encapsulates some business logic. A user accesses the application through a client device. Many types of client devices are possible, with the list growing as networks become more prevalent. Personal computers, telephone systems and even household appliances with micro- controllers could be the client device. For simplicity, the client device is illustrated herein as a personal computer (PC) 120, though the specific type of client device is not important to the invention. PC 120 is connected to network 122 and can therefore access application under test 114. In use, it is contemplated that there would be multiple users connected to application under test 114, but only one user is shown for simplicity. The number of users simultaneously accessing application under test 114 is one indication of the "load" on the application.

Access to the application under test is, in the illustrated embodiment, through Graphical User Interface (GUI) 124 of the type known in the art. Software to manage interactions between multiple users and an application is known. Such software is sometimes called a web server. Web servers operate in conjunction with a browser, which is software commonly found on most PC's.

The web server and browser exchange information in a standard format known as HTML. An HTML file contains tags, with specific information associated with each tag. The tag signals o the browser a type associated with the information, which allows the browser to display the information in an appropriate format. For example, the tag might signal whether the information is a title for the page or whether the information is a link to another web page. The browser creates a screen display in a particular window running on PC 120 based on one or more HTML pages sent by the web server.

When a user inputs commands or data into the window of the browser, the browser uses the information on the HTML page to format this information and send it to the web server. In this way, the web server knows how to process the commands and data that comes from the user.

GUI 124 passes the information and commands it receives on to middleware 116. In the example of FIG. 1, middleware 116 is depicted as a middleware application created with EJBs. Containers 130 are, in a preferred embodiment, commercially available containers. Within a container, are numerous enterprise Java beans 132. Each Java bean can more generally be thought of as a component. GUI 124, based on the information from user PC 120, passes the information to the appropriate EJB 132. Outputs from application under test 114 are provided back through GUI 124 to PC 120 for display to a user.

EJB's 132, in the illustrated example, collectively implement a database application. EJB's 132 manage interactions with and process data from databases 126 and 128. They will perform such database functions as setting values in a particular record or getting values from a particular record. Other functions are creating rows in the database and finding rows in the database. EJB's that access the database are often referred to as "entity beans."

Other types of EJB's perform computation or control functions. These are called "session beans." Session beans perform such functions as validating data entries or reporting to a user that an entry is erroneous. Session beans generally call entity beans to perform database access.

It will be appreciated that, while it is generally preferable to segregate programming of the application in such a way that each type of database transaction is controlled by a single bean that performs only that function, some entity beans will perform functions not strictly tied to database access. Likewise, some session beans will perform database access functions without calling an entity bean. Thus, while different testing techniques will be described herein for testing session beans and entity beans, it is possible that some EJB's will have attributes of both entity and session beans. Consequently, a full test of any bean might employ techniques of testing entity beans and testing session beans.

Test system 110 is able to access the EJB's 132 of application under test 114 over network 122. In this way, each bean can be exercised for testing. In the preferred embodiment, the tests are predominately directed at determining the response time of the beans—or more generally determining the response time of components or objects used to create the application under test. Knowing the response time of a bean can allow conclusions about the performance of an application. The details of test system 110 are described below.

In the illustrated embodiment, test system 110 is software installed on one or more servers. It is conceptually much like application under test 114. In a preferred embodiment, test system 110 is a JAVA application. Like application under test 114, test system 110 is controlled through a graphical user interface 150. GUI 150 might be a web server as known in the art. One or more application developers or test engineers might access test system over the network 122. In FIG. 1, PC's 152 and 154 are PC's used by testers who will control the test process.

Like application under test 114, multiple individuals might use test system 110 simultaneously. For example, multiple testers might be testing a single application. Each tester might be focused on testing different aspects of the application. Alternatively, each tester might be testing a different application. Numerous applications might be installed on computers on network 122. Test system 110 might be testing different applications at the same time.

Figure 2:
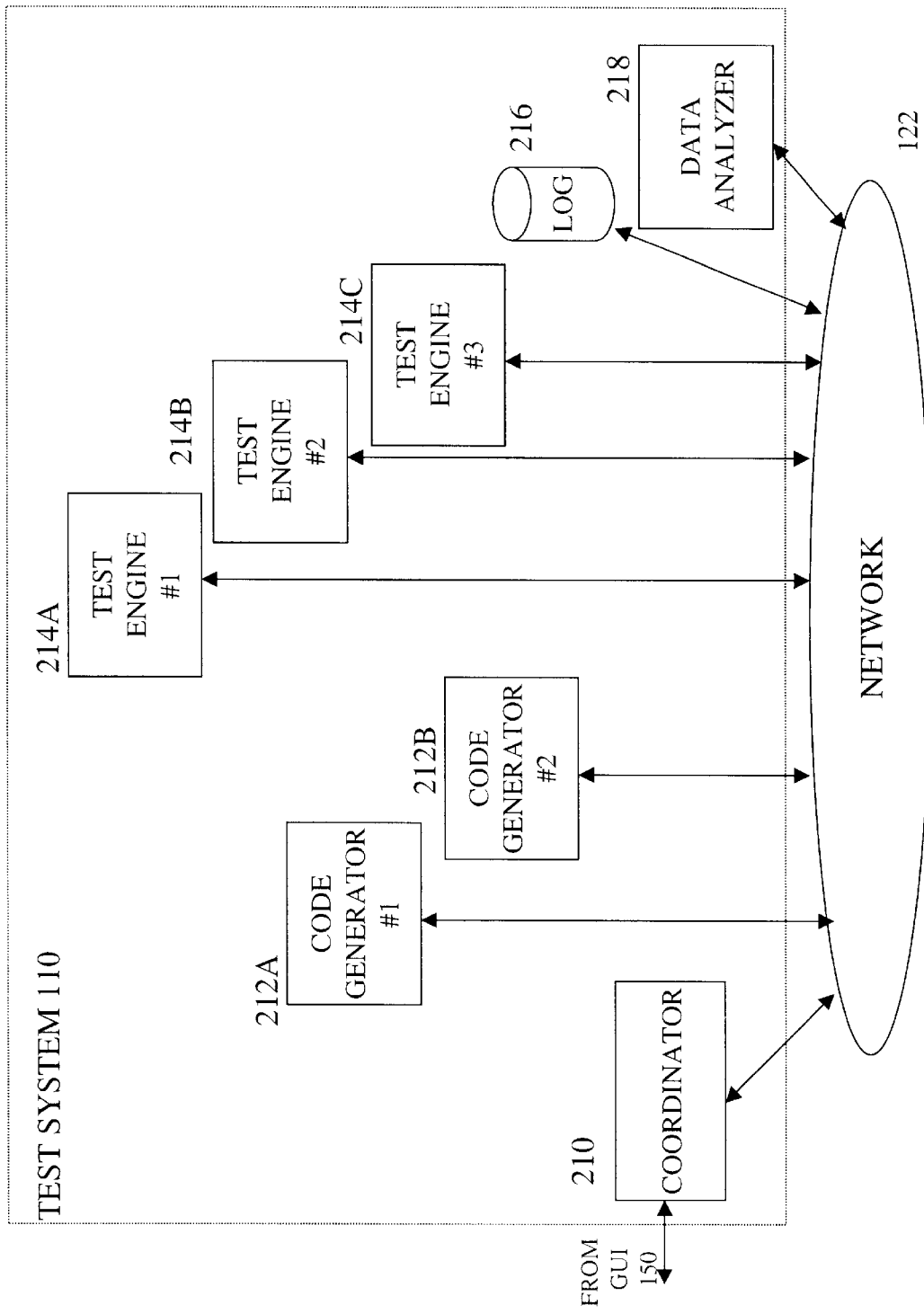
FIG. 2 is an illustration showing the test system of the invention in greater detail.

Turning now to FIG. 2, details of test system 110 are shown. Test system 110 performs several functions. One function is the generation of test code. A second function is to execute the test code to exercise one or more EJB's in the application under test. Another function is to record and analyze the results of executing the test code. These functions are performed by software running on one or more computers connected to network 122. The software is written using a commercially available language to perform the functions described herein.

FIG. 2 shows that test system 110 has a distributed architecture. Software components are installed on several different computers. Multiple computers are used both to provide capability for multiple users, to a allow a user to perform multiple tasks and also to run very large tests. The specific number of computers and the distribution of software components of the test system on those computers is not important to the invention.

Figure 3:
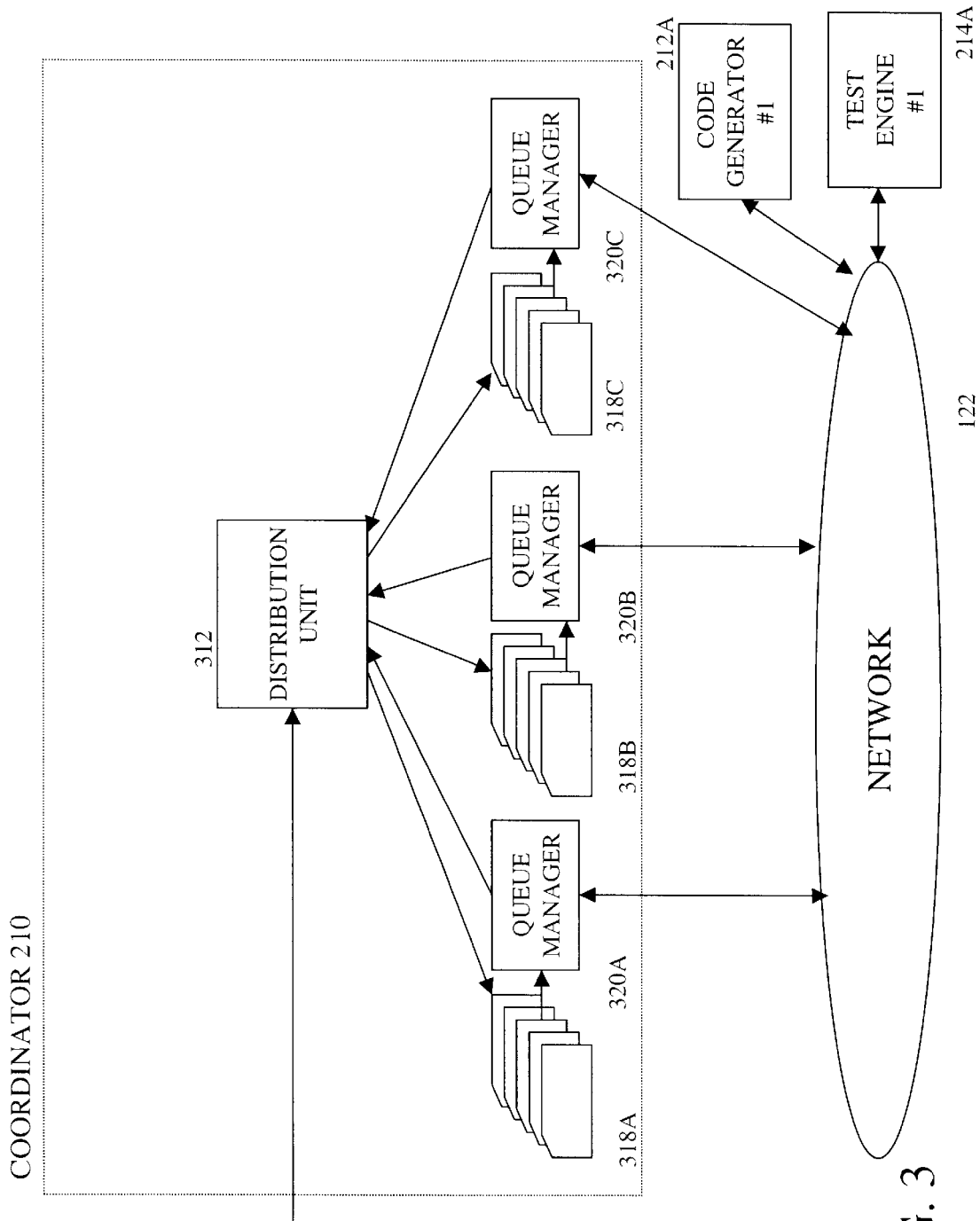
FIG. 3 is an illustration showing the coordinator of FIG. 2 in greater detail.

Coordinator 210 is a software application that interfaces with GUI 150. The main purpose of coordinator 210 is to route user requests to an appropriate server in a fashion that is transparent to a user. Turning to FIG. 3, coordinator 210 is shown in greater detail. It should be appreciated, though, that FIG. 3 shows the conceptual structure of coordinator 210. Coordinator 210 might not be a single, separately identified piece of software. It might, for example, be implemented as coordination software within the various other components of test system 110. Also, it should be realized that a web server used to implement GUI 150 also provides coordination functions, such as queuing multiple requests from an individual or coordinating multiple users.

Coordinator 210 contains distribution unit 312. Distribution unit 312 is preferably a software program running on a server. As user requests are received from GUI 150, they are received by distribution unit 312. As the requests are received, distribution unit 312 determines the type of resource needed to process the request. For example, a request to generate code must be sent to a server that is running a code generator.

Coordinator 210 includes several queues to hold the pending requests. Each queue is implemented in the memory of the server implementing coordinator 210. In FIG. 3, queues 318A . . . 318C are illustrated. Each queue 318A . . . 318C corresponds to a particular type of resource. For example, queue 318A could contain code generator requests, queue 318B could contain test engine requests and queue 318C could contain data analysis requests. Distribution unit sends each request to one of the queues 318A . . . 318C, based on the type of resources needed to process the request.

Associated with each queue 318A . . . 318C is queue manager 320A . . . 320C. Each queue manager is preferably implemented as software running on the server implementing coordinator 210 or the server implementing the relevant piece of coordinator 210. Each queue manager maintains a list of servers within test system 110 that can respond to the requests in its associated queue. A queue manager sends the request at the top of the queue to a server that is equipped to handle the request. The connection between the queue manager and the servers equipped to handle the requests is over network 122. If there are other servers available and still more requests in the queue, the queue manager will send the next request in the queue to an available server. When there are no available servers, each queue manager waits for one of the servers to complete the processing of its assigned request.

As the requests are processed, the servers, such as the code generators and the test engines report back to the queue managers. In response, the queue managers send another request from the queue and also provide the results back to the distribution unit 312. Distribution unit 312 can then reply back to the user that issued the request, indicating that the request was completed and either giving the results or giving the location of the results. For example, after test code is generated, the user might receive an indication of where the test code is stored. After a test is executed, the user might receive a report of the average execution time for the test or the location of a file storing each measurement made during the test.

It will be appreciated by one of skill in the art that software systems that process user commands, including commands from multiple users, are well known. Such systems must have an interface for receiving commands from a user, processing those commands and presenting results to the user. Such interfaces also allow those results to be used by the user for implementing further commands. Such an interface is employed here as well and is depicted generally as GUI 150. For example, GUI 150 will allow a user to enter a command that indicates code should be generated to test a particular application. Once the code is generated, GUI 150 allows the user to specify that a test should be run using that test code.

It is possible that some requests will require the coordination of multiple hardware elements. As will be described hereafter, one of the functions of the test engines is to apply a load that simulates multiple users. In some instances, one computer can simulate multiple users by running multiple client threads. However, there is a limit to the number of client threads that can run on a server.

Figure 4:
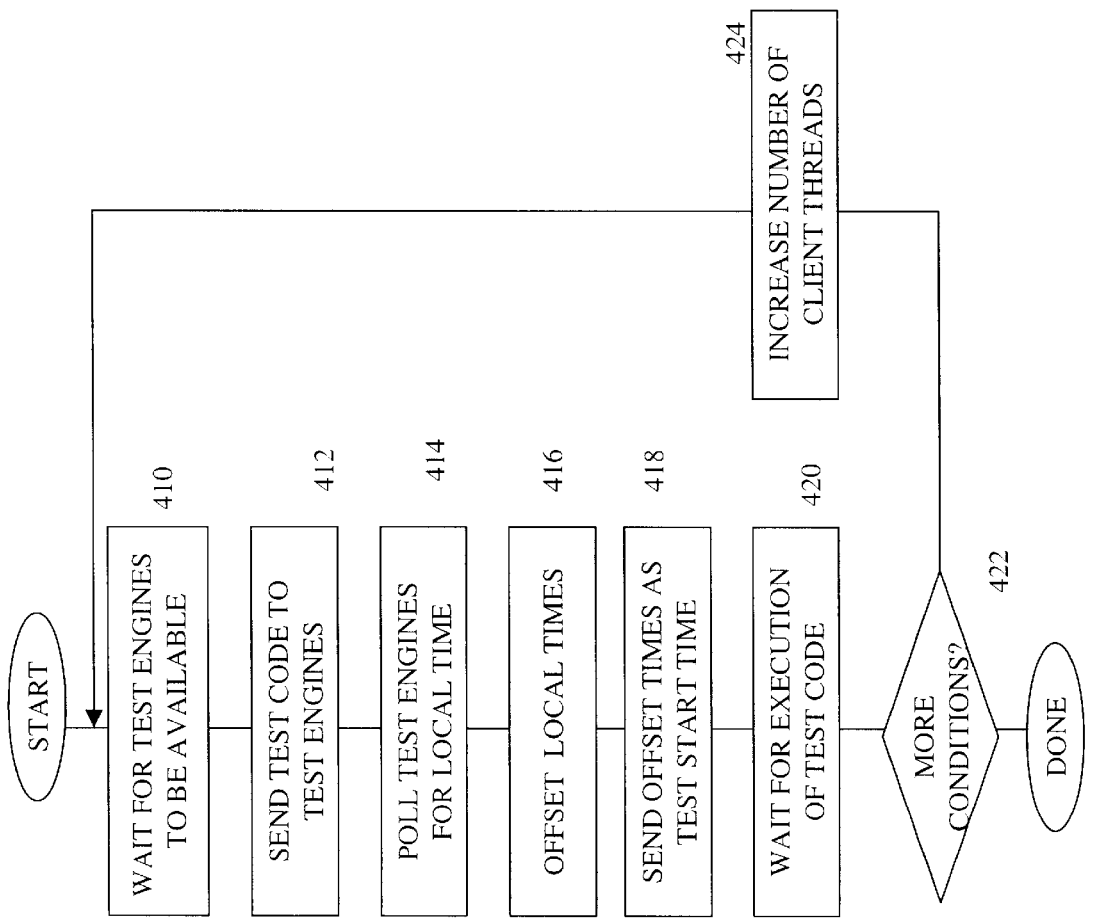
FIG. 4 is a flow chart illustrating the process of coordinating execution of load tests.

FIG. 4 shows the process by which queue manager 320B coordinates the actions of test engines located on separate servers. At step 410, queue manager 320B waits for the required number of test engines to become available. Once the test engines are available, at step 412 queue manager 320B sends commands to each test engine that will be involved in the test to download the test code from the appropriate one of the code generators 212A and 212B.

Queue manager 320B then begins the process of synchronizing the test engines located on different servers. Various methods could be used to synchronize the servers. For example, if very great accuracy is required, each server could be equipped with radio receivers that receive satellite transmissions that are intended to act as time reference signals, such as in a GPS system. Calibration processes could alternatively be used to determine the amount of time it takes for a command to reach and be processed by each server. Commands could then be sent to each server at times offset to make up for the time differences. In the preferred embodiment, a simple process is used. At step 414, queue manager sends a message to each server to be acting as a test engine. The message asks that server to report the time as kept by its own internal circuitry.

Upon receiving the internal time as kept by each of the servers, at step 416 queue manager 320B adds the same offset to each local time. At step 418, queue manager 418 sends the offset times back to the servers. The offset local times become the local starting time of the test for each server. Each server is instructed to start the test when its local time matches the offset local time. In this way, all the servers start the test simultaneously.

Queue manager 320B waits for the execution of the test code at block 420. Some test cases will entail multiple tests. At step 422, a check is made of whether the particular test case being executed requires more tests. For example, as will be described in greater detail below, one kind of test case that test system 110 will run is a load test. During a load test, multiple test engines, each executing multiple client threads, execute to simulate multiple users accessing application under test 114. An operating parameter of application under test 114 is then measured. In the preferred embodiment, the number of simultaneous users being simulated can be varied and the operating parameter measured again. Taking data at multiple load conditions allows test system 110 to determine the affect of load on application under test 114. Measurements of these types require that a full test case include multiple repetitions of the same test with different load conditions.

If there are more conditions under which the test should be run, execution proceeds to step 424. At step 424, the number of client threads is increased as needed for the new test case. Execution then loops back to step 410. At step 410, queue manager 320B waits for the required number of test engines to be available. When the hardware is available, the test is performed through steps 412, 414, 416, 418 and 420 in the same manner as for the first test condition. At step 422, a check is for whether the request entails multiple test conditions. If there are no further test conditions, the request from queue 318B is considered complete. If there are further test conditions that need to be run to complete the request, the process is again repeated.

Figure 5:
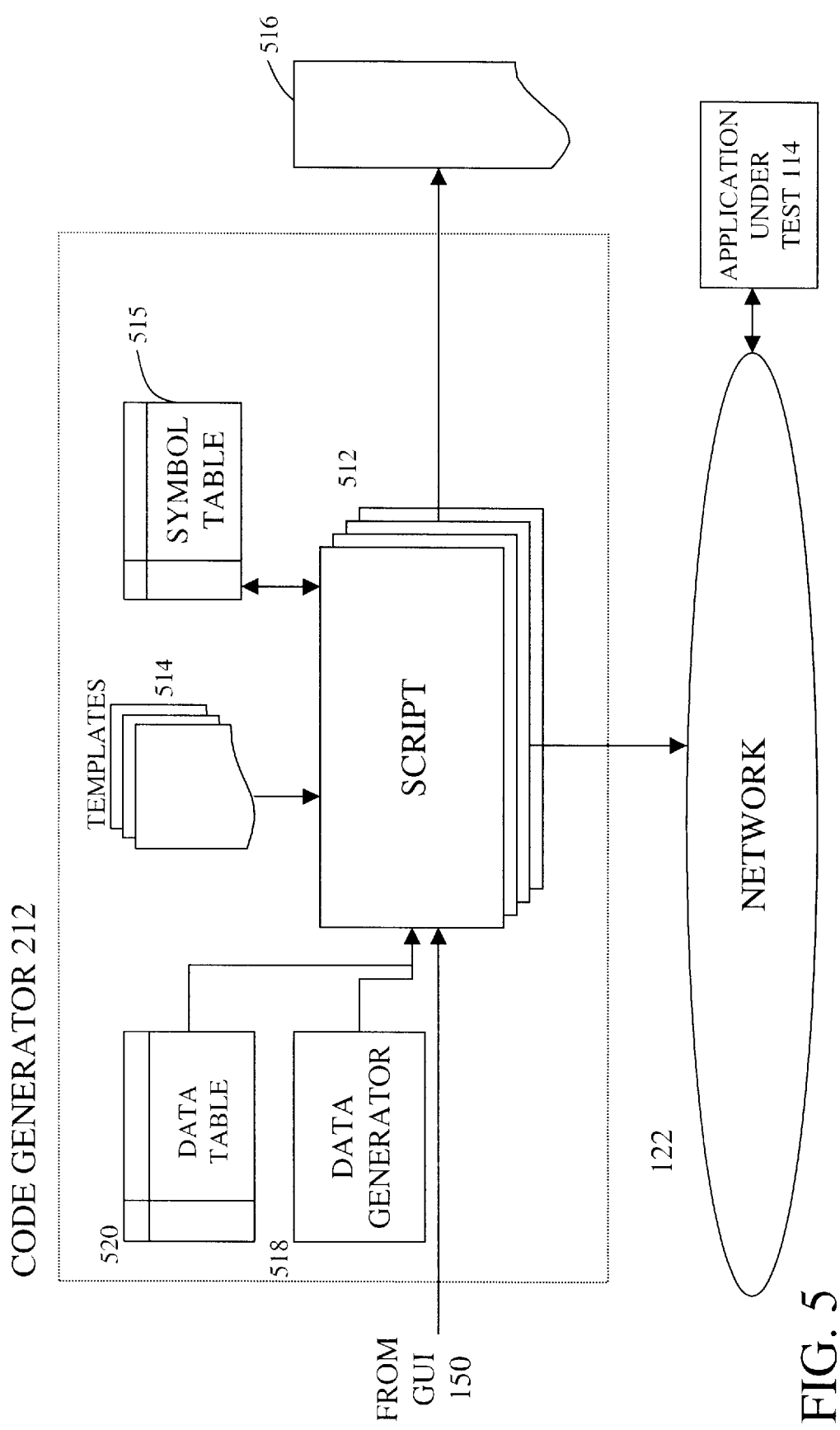
FIG. 5 is an illustration showing the code generator of FIG. 2 in greater detail.

For test system 110 to operate, it is necessary that there be test code. A user could provide test code. Or, test code could be provided by automatic code generation systems, such as TESTMASTER sold by Teradyne Software and System Test of Nashua, N.H. However, FIG. 2 illustrates that code generators 212A and 212B are used in the preferred embodiment to create the code. Turning to FIG. 5, greater details of a code generator 212 are shown.

Code generator 212 contains several scripts 512. Each script is a sequence of steps that code generator 212 must perform to create code that performs a certain type of test. The scripts can be prepared in any convenient programming language. For each type of test that test system 110 will perform, a script is provided. User input on the type of test that is desired specifies which script 512 is to be used for generating code at any given time. Appendix 1 contains an example of a script.

The selected script 512 assembles test code 516. The information needed to assemble test code 516 comes from several sources. One source of information is the test templates 514. There are some steps that are needed in almost any kind of test. For example, the object being tested must be deployed and some initialization sequence is required. If the tests are timed, there must be code that starts the test at a specified start time and an ending time of the test must be recorded. Also, there must be code that causes the required data to be logged during the test. After the test, there might also be some termination steps that are required. For example, where the initialization started with a request for a reference to a particular EJB, the test code will likely terminate with that reference being released. The test code to cause these steps to be performed is captured in the set of templates 514.

In addition, there might be different templates to ensure that the test code 516 appropriately reflects inputs provided by the user. For example, different containers might require different command formats to achieve the same result. One way these different formats can be reflected in the test code 516 is by having different templates for each container. Alternatively, a user might be able to specify the type of information that is to be recorded during a test. In that instance, a data logging preference might be implemented by having a set of templates that differ in the command lines that cause data to be recorded during a test. An example template is shown in Appendix 2.

The templates are written so that certain spaces can be filled in to customize the code for the specific object to be tested. In the preferred embodiment, code generator 212 generates code to test a specific EJB in an application under test. One piece of information that will need to be filled in for many templates is a description of the EJB being tested. Another piece of information that might be included is user code to put the application under test in the appropriate state for a test. For example, in testing a component of an application that manages a database of account information for a bank, it might be necessary to have a specific account created in the database to use for test purposes or it might otherwise be necessary to initialize an application before testing it. The code needed to cause these events might be unique to the application and will therefore be best inserted into the test code by the tester testing the application. In the illustrated embodiment, this code is inserted into the template and is then carried through to the final test code.

The template might also contain spaces for a human tester to fill in other information, such as specific data sets to use for a test. However, in the presently preferred embodiment, data sets are provided by the human user in the form of a data table.

Code generator 212 could generate functional tests. Functional tests are those tests that are directed at determining whether the bean correctly performs its required functions. In a functional test, the software under test is exercised with many test cases to ensure that it operates correctly in every state. Data tables indicating expected outputs for various inputs are used to create functional test software. However, in the presently preferred embodiment, code generator 212 primarily generates test code that performs load tests. In a load test, it is not necessary to stimulate the software under test to exercise every possible function and combination of functions the software is intended to perform. Rather, it is usually sufficient to provide one test condition. The objective of the load test is to measure how operation of the software degrades as the number of simultaneous users of the application increases.

In the preferred embodiment, test system 110 contains scripts 512 to implement various types of load tests. One type of load test determines response time of an EJB. This allows the test system to vary the load on the EJB and determine degradation of response time in response to increased load. Another type of load test is a regression type load test. In a regression type test, the script runs operations to determine whether the EJB responds the same way as it did to some baseline stimulus. In general, the response to the baseline stimulus represents the correct operation of the EJB. Having a regression type test allows the test system 110 to increase the load on a bean and determine the error rate as a function of load.

To generate test code 516 for these types of load tests, the script 512 must create test code that is specific to the bean under test. The user provides information on which bean to test through GUI 150. In the preferred embodiment, this information is provided by the human tester providing the name of the file within the application under test that contains the "deployment descriptor" for the specific bean under test. This information specifies where in the network to find the bean under test. Script 512 uses this information to ascertain what test code must be generated to test the bean.

Script 512 can generate code by using the attributes of the platform independent language in which the bean is written. For the example of Sun JAVA language being used here, each bean has an application program interface called a "reflection." More particularly, each bean has a "home" interface and a "remote" interface. The "home" interface reveals information about the methods for creating or finding a remote interface in the bean. The remote interface reveals how this code can be accessed from client software. Of particular interest in the preferred embodiment, the home and remote interfaces provide the information needed to create a test program to access the bean.

Using the reflection, any program can determine what are known as the "properties" and "methods" of a bean. The properties of a bean describe the data types and attributes for a variable used in the bean. Every variable used in the bean must have a property associated with it. In this way, script 512 can automatically determine what methods need to be exercised to test a bean and the variables that need to be generated in order to provide stimulus to the methods. The variables that will be by the methods as they are tested can also be determined. In the preferred embodiment, this information is stored in symbol table 515.

Symbol table 515 is a file in any convenient file format. Many formats for storing tabular data are known, such as .xml format. Once the information on the methods and properties are captured in a table, script 515 can use this information to create test code that exercises the methods and properties of the particular component under test. In particular, script 515 can automatically create a variable of the correct data type and assign it a value consistent with that type for any variable used in the bean.

FIG. 5 shows a data generator 518. Data generator 518 uses the information derived from the reflection interface to generate values for variables used during testing of a bean. There are many ways that appropriate values could be generated for each variable used in the test of a particular bean. However, in the commercial embodiment of the present invention, the user is given a choice of three different algorithms that data generator 518 will use to generate data values. The user can specify "maximum," "minimum" or "random." If the maximum choice is specified, data generator 518 analyzes the property description obtained through the reflection interface and determines the maximum permissible value. If the user specifies "minimum" then data generator 518 generates the smallest value possible. If the user specifies random, data generator 518 selects a value at random between the maximum and the minimum.

In many instances where a load test is desired, the exact value of a particular variable is not important. For example, when testing whether a bean can properly store and retrieve a value from a database, it usually does not matter what value is stored and retrieved. It only matters that the value that is read from the database is the same one that was stored. Or, when timing the operation of a particular bean, it will often not matter what values are input to the method. In these scenarios, data generator 518 can automatically generate the values for variables used in the test code.

In cases where the specific values of the variables used in a test are important, code generator 212 provides the user with another option. Rather than derive values of variables from data generator 518, script 512 can be instructed to derive data values from a user provided data table 520. A user might, for example, want to provide a data table even for a load test when the execution time of a particular function would depend on the value of the input data.

A data table is implemented simply as a file on one of the computers on network 122. The entries in the table, specifying values for particular variables to use as inputs and outputs to particular methods, are separated by delimiters in the file. A standard format for such a table is "comma separated values" or CSV. In a preferred embodiment, test system 110 includes a file editor—of the type using conventional technology—for creating and editing such a file. In addition, test system 110 would likely include the ability to import a file—again using known techniques—that has the required format.

The methods of a bean describe the functions that bean can perform. Part of the description of the method is the properties of the variables that are inputs or outputs to the method. A second part of the description of each method—which can also be determined through the reflection interface—is the command needed to invoke this method. Because script 512 can determine the code needed to invoke any method and, as described above, can generate data values suitable to provide as inputs to that method, script 512 can generate code to call any method in the bean.

In the preferred embodiment, directed at load testing, the order in which the methods of a bean are called is not critical to an effective test. Thus, script 512 can automatically generate useful test code by invoking each method of the bean. The order in which the methods are invoked does not matter if the only parameter that is measured is the time it takes the methods to execute.

More sophisticated tests can be automatically built by relying on the prescribed pattern for the language. In Sun JAVA, entity beans for controlling access to a database should have methods that have a prefix "set" or "get". These prefixes signal that the method is either to write data into a database or to read data from the database. The suffix of the method name indicates which value is to be written or read in the database. For example, a method named setSSN should perform the function of writing into a database a value for a parameter identified as SSN. A method named getSSN should read the value from the parameter named SSN.

By taking advantage of these prescribed patterns, script 512 can generate code to exercise and verify operation of both methods. A piece of test code generated to test these methods would first exercise the method setSSN by providing it an argument created by data generator 518. Then, the method getSSN might be exercised. If the get method returns the same value as the argument that was supplied to the set method, then it can be ascertained that the database access executed as expected.

For many types of enterprise wide applications, the beans most likely to be sensitive to load are those that access the database. Thus, testing only set and get methods provides very useful load test information.

However, the amount of testing done can be expanded where required. Some beans also contain methods that create or find rows in a database. By convention, methods that create or find rows in a database are named starting with "create" or "find." Thus, by reflecting the interface of the bean, script 512 can also determine how to test these methods. These methods can be exercised similarly to the set and get methods. The properties revealed through the application interface will described the format of each row in the database. Thus, when a create method is used, data can be automatically generated to fill that row, thereby fully exercising the create method.

In a preferred embodiment, find methods are exercised using data from a user supplied data table 520. Often, databases have test rows inserted in them specifically for testing. Such a test row would likely be written into data table 520. However, it would also be possible to create a row, fill it with data and then exercise a find method to locate that row.

Once the commands that exercise the methods of an EJB are created, script 512 can also insert into the client test code 516 the commands that are necessary to record the outputs of the test. If a test is checking for numbers of errors, then test code 516 needs to contain instructions that record errors in log 216. Likewise, if a test is measuring response time, the test code 516 must contain instructions that write into log 216 the information from which response time can be determined. In the described embodiment, all major database functions can be exercised with no user supplied test code. In some instances, it might be possible to exercise all the functions with all test data automatically generated. All the required information could be generated from just the object code of the application under test. An important feature of the preferred embodiment is that it is "minimally invasive"—meaning that very little is required of the user in order to conduct a test and the test does not impact the customer's environment. There is no invasive test harness. The client code runs exactly like the code a user would write.

In some scenarios, it will be necessary or desirable for a user to insert specific steps into the test code 516. Test system 110 allows for the user to edit test code 516. For example, some beans will perform calculations or perform functions other than database access. In these instances, the user might chose to insert test code that exercises these functions. However, because bottlenecks in the operation of many N-tiered applications occur in the entity beans that manage database transactions, the simple techniques described herein are very useful.

Appendix 3 gives an example of test code that has been generated. Once test code 516 is generated, with or without editing by a user, test system 110 is ready to execute a test. User input to coordinator 210 triggers the test. As described above, coordinator 210 queues up requests for tests and tests are executed according to the process pictured in FIG. 4. To simulate one user, the test code 516 is executed as a single thread on one of the test engines 214A . . . 214C. To simulate multiple users, multiple threads are initiated on one or more of the test engines 214A . . . 214C.

The results of any tests are stored in log 216. FIG. 2 shows log 216 as a separate hardware element attached to network 122. Log 216 could be any type of storage traditionally found in a network, such as a tape or disk drive attached to a computer server. For simplicity, it is shown as a separate unit, but could easily be part of any other server in the network.

Many types of data could be stored in log 216. For example, there are several possible ways that "response time" could be measured. One way is that the total time to execute all the methods in a bean could be measured. Another way is that the start up time of a bean could be measured. The startup time is the time it takes from when the bean is first accessed until the first method is able to execute. Another way to measure response time is to measure the time it takes for each method to execute. As another variation, response time could be measured based on how long it takes just the "get-" methods to execute or just the "set-" methods to execute.

Different measurements must be recorded, depending on which measure of response time is used. For example, if only the total response time is required, it is sufficient if the test code simply records the time that the portion of the test code that exercises all the methods starts and stops executing. If the startup response time is required, then the client test code must record the time that it first accesses the bean under test and the time when the first method in the test sequence is ready to be called. On the other hand, if the response time is going to be computed for each method, the client test code must record the time before and after it calls each method and some indication of the method being called must also be logged. Similar information must be recorded if responses of just "get-" or "set-" functions are to be measured, though the information needs to be recorded for only a subset of the methods in these cases.

In addition, when there are multiple users being simulated, there are multiple values for each data point. For example, if test system 110 is simulating 100 users, the time that it takes for the bean to respond to each simulated user could be different, leading to up to 100 different measurements of response time. The response time for 100 users could be presented as the maximum response time, i.e. the time it takes for all 100 simulated users to finish exercising the bean under test. Alternative, the average time to complete could be reported as the response time. As another variation, the range of values could be reported.

In the preferred embodiment, the client test code 516 contains the instructions that record all of the information that would be needed for any possible measure of response time and every possible display format. The time is recorded before and after the execution of every method. Also, an indication that allows the method to be identified is recorded in log 216. To support analysis based on factors other than delay, the actual and expected results of the execution of each method are recorded so that errors can be detected. Also, the occurrences of exceptions are also recorded in the log. Then, data analyzer 218 can review the log and display the response time according to any format and using any definition of response time desired. Or the data analyzer can count the number of exceptions or errors.

Once the data is stored, the user can specify the desired format in which the data is to be presented. Data analyzer 218 accepts commands from the tester concerning the format of the output and analyzes the data appropriately. In a preferred embodiment, test system 110 has the ability to present the results of tests graphically to aid the tester in understanding the operations—particularly performance bottleneck—of application under test 114.

Data analyzer 218 generates output in several useful formats. One important output is a response time versus load graph. Log file 216 contains the starting and stopping times of execution tests for a particular test case. The test case includes the same measurements at several different load conditions (i.e. with the test engines 214A . . . 214C simulating different numbers of simultaneous users). Thus, data analyzer can read through the data in log 216 and identify results obtained at different load conditions. This data can be graphed.

Another useful analysis is the number of errors per second that are generated as a function of the number of simultaneous users. To perform this analysis, test code 516 could contain instructions that write an error message into log 216 whenever a test statement produces an incorrect result. In the database context, incorrect results could be identified when the "get" function does not return the same value as was passed as an argument to the "set" function. Or, errors might be identified when a bean, when accessed, does not respond or responds with an exception condition. As above, data analyzer 218 can pass through the log file, reading the numbers of errors at different simulated load conditions. If desired, the errors can be expressed as an error count, or as an error rate by dividing the error count by the time it took for the test to run.

Some examples of the types of outputs that might be provided are graphs showing: transactions per second versus number of users; response time versus number of users; exceptions versus numbers of users; errors versus numbers of users; response time by method; response time versus run time and transactions per second versus run time. Different ways to measure response time were discussed above. In the preferred embodiment, a transaction is defined as the execution of one method, though other definitions are possible.

Figure 6:
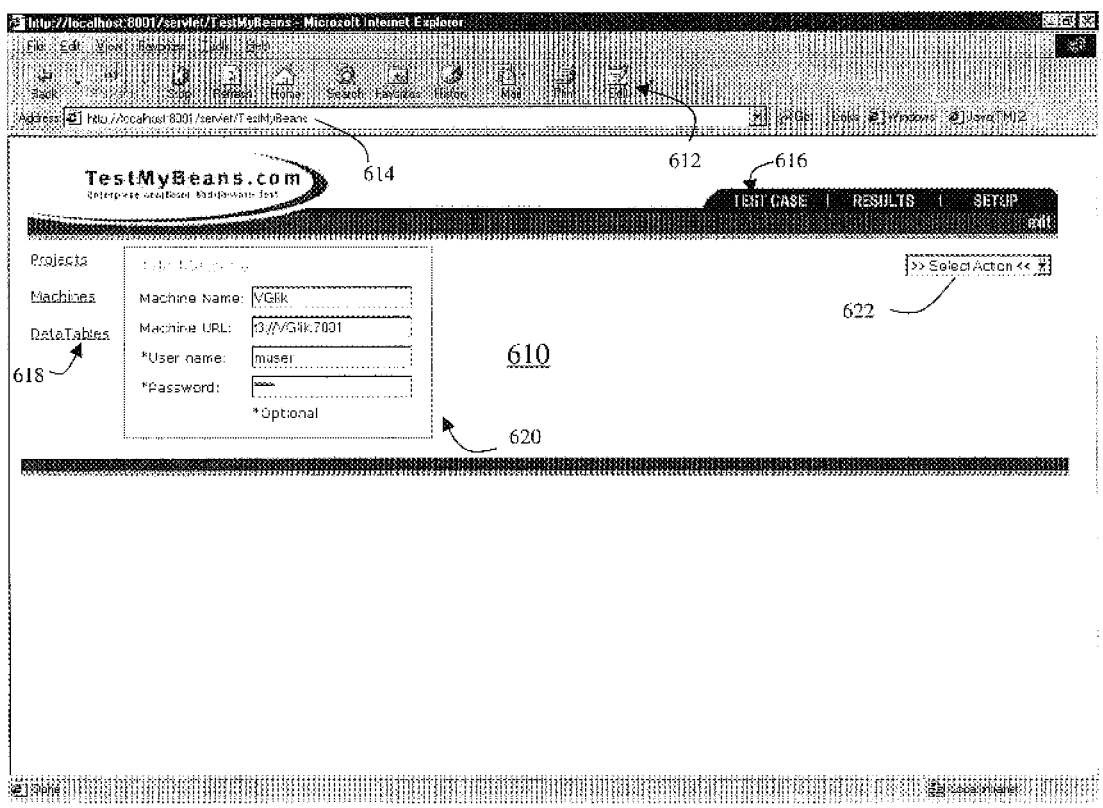
FIG. 6 illustrates a user interface of test system 110 during a setup phase.

Run time is defined as the total elapsed time in running the test case, and would include the time to set up the execution of EJBs. Viewing response time as a function of elapsed time is useful, for example, in revealing problems such as "memory leaks". A memory leak refers to a condition in which portions of the memory on the server running the application under test gets used for unproductive things. As more memory is used unproductively, there is less memory available for running the application under test and execution slows over time. Alternatively, viewing results in this format might reveal that the application under test is effectively utilizing caching. If caching is used effectively, the execution time might decrease as elapsed time increases. Turning now to FIG. 6, operation of test system 110 from the tester's perspective is illustrated. FIG. 6 illustrates the tester interface to be a traditional web browser interface as it would appear on the terminal of PC 152 or 154. This type of interface is the result of using a web server to implement GUI 150 with commercially available browser software on the tester PC's 152 and 154.

Element 612 is the browser toolbar. The browser provides the ability for the tester to perform such functions as printing and connecting to pages presented by various servers in the system. The tester performs these functions through the use of the tool bar 612. Field 614 indicates the server to which the PC 152 or 154 is currently connected. In the illustrated example, field 614 contains the address on network 122 for the server containing GUI 150.

Window 610 is the area of the screen of PC 152 or 154 where information specific to test system 110 is displayed. As with traditional web based applications, this information is displayed as the result of HTML files that are downloaded over network 122. Certain elements displayed in window 610 represent hyperlinks, which when accessed by a tester cause other pages to be downloaded so that different information is displayed for the tester. Other elements displayed in window 610 represent data entry fields. When a human tester fills in these fields, information is submitted to test system 110.

Tabs 616 represent choices a tester can select for operating mode. FIG. 6 shows three tabs. There is one tab for "setup", one for "test case" and one for "results". Each of the tabs is hyperlinked. These hyperlinks connect to pages on servers in the network that are programmed to manage the test system through a particular phase. Setup is for configuring the test system, such as by identifying addresses for servers on network 122 that contain test engines. "Test case" is for creating and running a particular test case, which in the preferred embodiment means test code for a particular bean and parameters specifying how that test code is to run. "Results" is for viewing the results of a test case that has executed. In FIG. 6, the "SETUP" tab is shown selected, meaning that the balance of window 610 displays hyperlinks and fields that are appropriate for entering data or commands for the SETUP phase.

Region 618 contains a set of hyperlinks. These hyperlinks present a list of choices to the user about what can be setup. Selecting one of these hyperlinks will change the information appearing in region 620. It is well known in the art of web based software to have hyperlinks on one part of window change information appearing in another part of the window.

In the Example of FIG. 6, the hyperlink "Machine" in region 618 has been selected. Therefore, region 620 contains fields that can be used to identify a machine to be added to test system 110. In FIG. 6, a screen to add a client host computer is shown. A client host computer acts as a test engine 214A . . . 214C.

Region 618 also contains hyperlinks for "Projects" and "Data Tables". As described above, test system 110 can be used by multiple testers or can be used to test multiple applications under test. To segregate the information relating to various tasks, a "Project" is defined. All information relating to a particular project is identified with the project. In this way, test system 110 can identify information that is logically related. For example, test code developed to test a particular bean in an application will be given the same project name as test code to test other beans in that application. In this way, general information about the application—such as the path to the server through which the application can be accessed is stored once with the project rather than with each piece of test code. As another example, the test results can be associated with the test code that generated them through the use of projects.

The hyperlink for "Data Tables" allows the tester to identify to the system where data tables are stored to test specific beans. In general, the tester will create the data tables by hand or automatically apart from test system 110 based on the features that the tester desires to have tested. The data tables will be stored in files on a computer on network 122. Before use by test system 110, the tester must provide the network address for that file.

Field 622 is a menu field. It is a drop down menu box. When accessed, it will display a menu of choices of the actions the tester can specify for test system 110. The contents of the menu is context sensitive, meaning that for any given page, only the menu choices that are appropriate are displayed. Actions that a user might want to choose from the menu are things such as edit, delete, add new, rename, etc.

Figure 7:
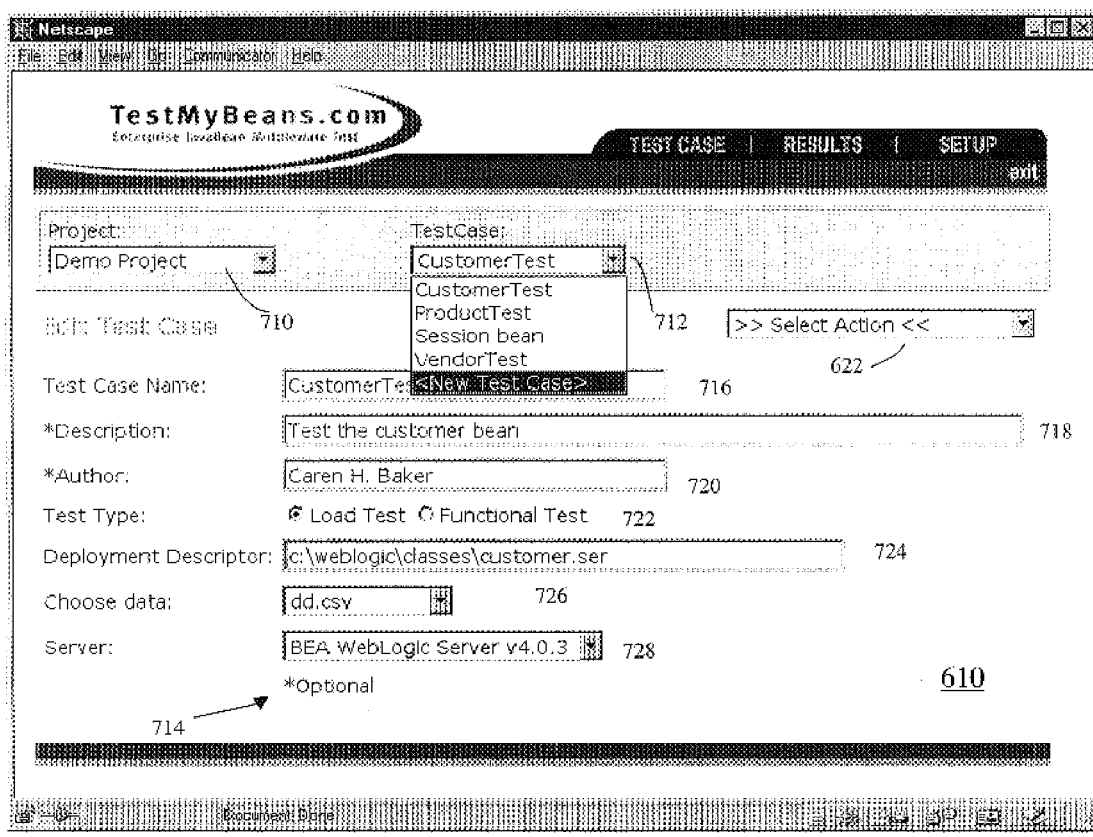
FIG. 7 illustrates a user interface of test system 110 during the specification of a test case.

Turning now to FIG. 7, a screen of tester PC 152 or 154 is shown when the TEST CASE tab selected. Selecting the TEST CASE tab allows the tester to specify what is to be tested and how the test is to be conducted. In the example of FIG. 7, window 610 contains information that describes a test case. This particular page is displayed when the "edit" has been selected in menu field 622. Field 710 indicates the name of the project to which the test case is associated. Field 710 is a screen display element known as a drop down box. When activated by a tester, field 710 will become a list of all projects that have been previously created by and tester using test system 110. As shown in FIG. 7, a project called "Demo Project" is being used.

Field 712 identifies the particular test case by name. Field 712 is also a drop down box, allowing previously defined test cases to be selected from a list. In addition, one of the options that appears when the drop down box is accessed is "<New Test Case>". When selected, a new test case is created and information about this test case can be entered. This type of menu is common for programs with graphical user interfaces and is used at several points in the interface for presenting choices to a human tester.

In the example of FIG. 7, a test case "Customer Test" has been created and information has already been entered. In region 714, there are a series of fields in which data can be entered or changed to define or modify the test case. In field 716, a name can be provided for the test case. This name allows the test case to be referenced in other parts of the test system.

In field 718, a description of the test case can be entered. This description is not used by the automatic features of the test system, but can act as a note to a human tester to signify what the test case does or why it was created. Field 720 is likewise not used by the automated system. However, this field holds the name of an individual who authored the test case to facilitate other administrative functions.

Field 722 is a "radio button" type field. It presents a tester with a list of choices, only one of which can be selected at a time. In this example, field 722 allows the tester to specify the type of test. As previously described, code generators 212A and 212B contain a plurality of scripts 512 that generate test code. As described above, the script assembles templates and generate command lines for a particular type of test that is to be conducted. Thus, the tester must specify the test type in order to allow the appropriate script to be selected. In this example, only two types of tests are presented as options to a tester—a load test and a functional test. These types of tests were discussed above. Field 724 allows the tester to specify a "deployment descriptor." In the JAVA language, every bean has associated with it a deployment descriptor. The deployment descriptor is a file that identifies the bean and defines the parameters with which the EJB will be deployed on the applications server. Examples of the parameters are the number of instantiations of the EJB with which to start the applications server (sometimes called a "pooling number") and how much memory is allocated to the bean. These functions are performed by the container 130.

The tester provides the deployment descriptor by entering the path to a file on network 122. The test system 110 reads the deployment descriptor to find the name of the bean under test and then to access the bean through reflection to determine its methods and properties.

Field 726 allows the tester to specify the type of data to be used in creating the test code 516. As described above, in the preferred embodiment, the data can be automatically generated by test system 110 or can be supplied through a data table. For automatic data generation, the data can be generated by using the maximum possible value of each variable, the minimum possible value or a value randomly selected between the maximum and the minimum. Alternatively, the data can be specified by a data table. In FIG. 7, field 726 indicates that tester desires test system 110 to generate data using the data table named dd.csv. If the tester had wanted the test system to automatically generate data, the tester would specify in field 726 whether the data was to be generated randomly or whether the maximum or minimum values were to be used.

Field 728 allows the user to specify the server on which the application under test runs. FIG. 1 shows that the beans 132 of the application under test are within a container 130. In this context, "server" refers to the software that creates the container for the application. For each platform independent language, there are a limited number of commercially available servers. Test system 110 contains script files that will generate the appropriate test code for any server. While most of the client test code will be server independent, it is possible that servers will implement certain functions in unique ways. Thus, there needs to be script files that account for the functions that are implemented differently on certain servers.

Figure 8:
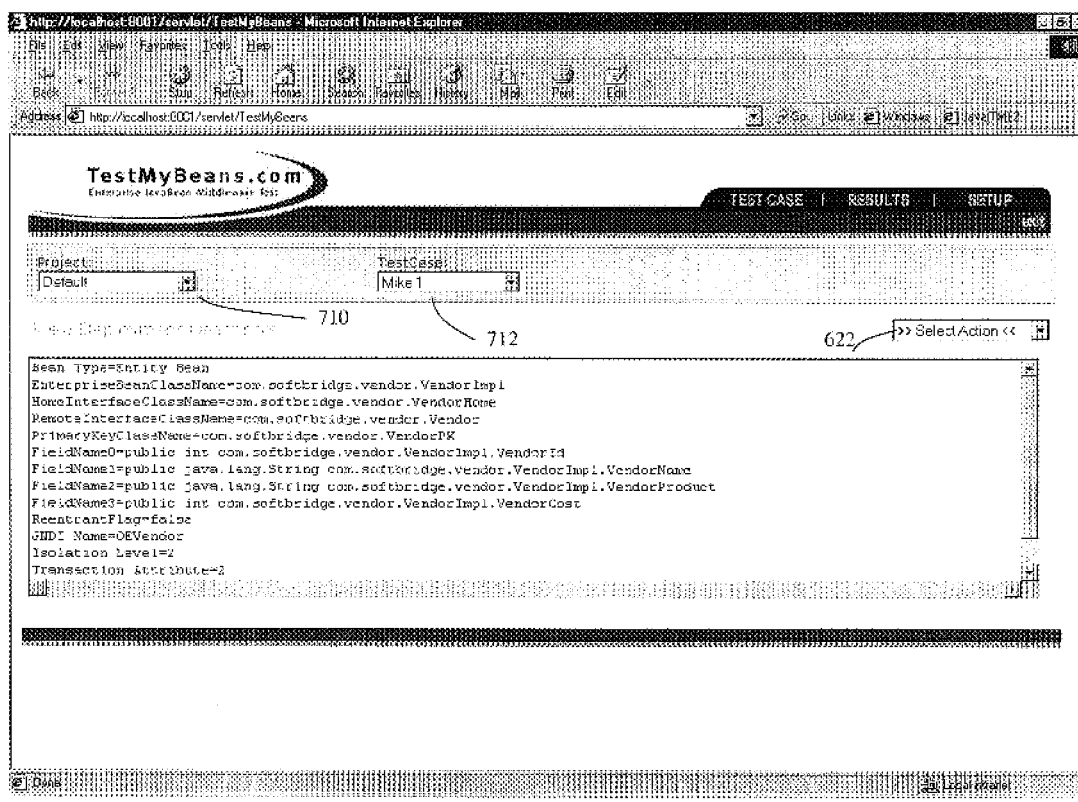
FIG. 8 illustrates a user interface of test system 110 during a different action as part of the specification of a test case.

FIG. 8 shows a screen display when the tester has used menu field 622 and selected to have the deployment descriptor for a test case to be displayed. If desired, the tester can then edit the deployment descriptor to try alternative configurations.

Figure 9:
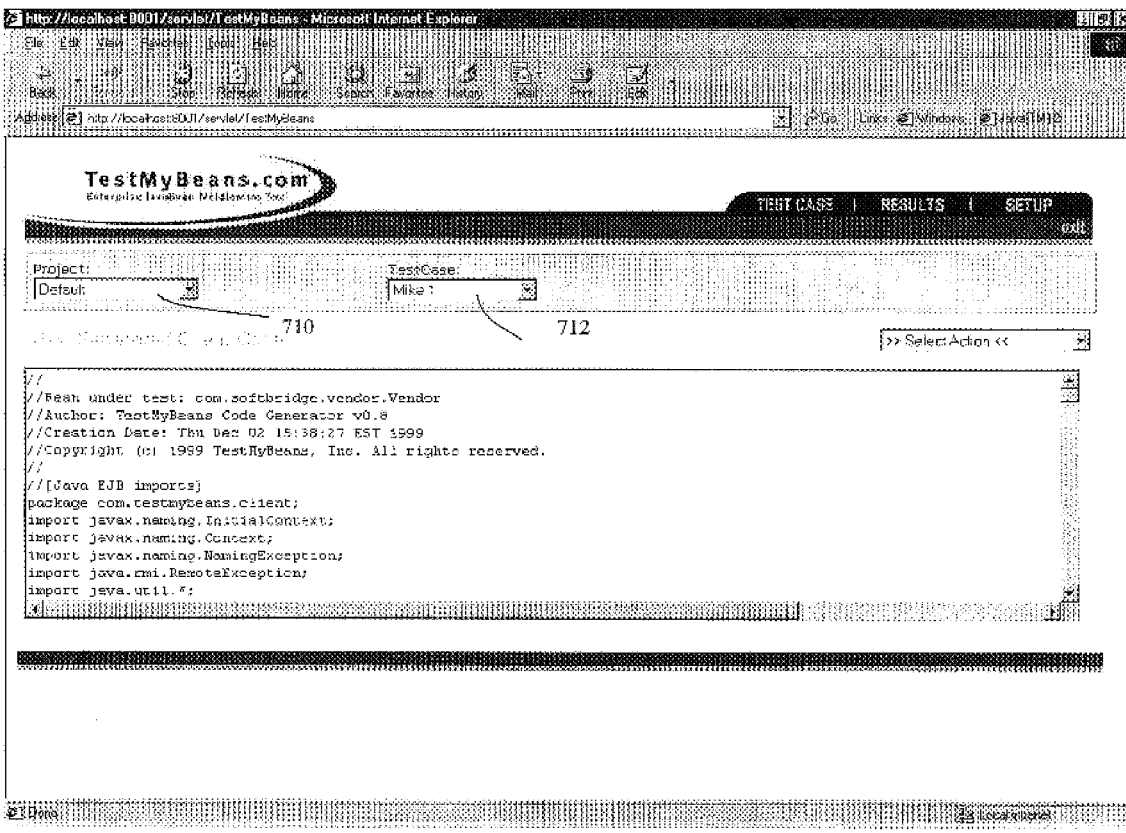
FIG. 9 illustrates a user interface of test system 110 during a different action as part of the specification of a test case.

FIG. 9 shows a screen display when a tester has selected from menu field 622 to have the generated test code displayed. In FIG. 9, the test code 516 is identified as "client code" because it will simulate the operation of a client 120 of the application under test 114. The displayed code corresponds to the code generated for the project and test case identified in fields 710 and 712. In this screen, the tester can also edit the test code.

One instance when a tester might desire to edit test code is when most of the commands in the test code can be automatically generated, but certain commands must have specific data values for the application under test to function properly. The tester could have test system 110 automatically generate the test code, but then manually edit the few data values that matter. As an example, a particular bean might include a method that processes positive and negative values differently. The tester might know that processing negative numbers takes longer and therefore change a randomly generated value to a negative number.

An alternative scenario in which a tester might wish to edit test code 516 is when the bean being tested contains methods to be tested other than those that follow a pattern, such as the "set", "get", "create" and "find" methods described above. The tester might create test code that tests methods that do not follow the pattern. This code could then be inserted by the human tester into the generated test code.

Figure 10:
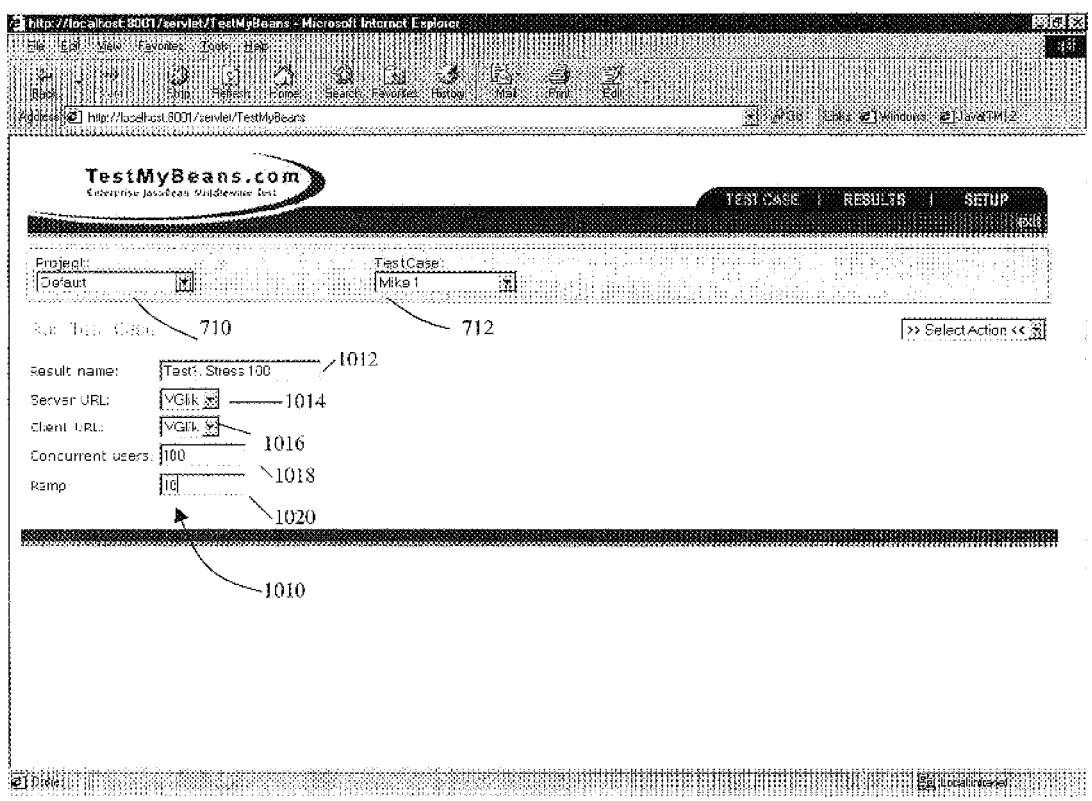
FIG. 10 illustrates a user interface of test system 110 during a different action as part of the specification of a test case.

FIG. 10 shows a screen display for another function performed by a human tester while specifying the TEST CASE, also selected through menu field 622. FIG. 10 is a screen display used when the test case is to be run. The project and specific test case is specified by entries in fields 710 and 712. Information about how to run the test case is entered in region 1010.

Region 1010 contains several fields. Field 1012 indicates the name of the file in log 216 where the results of executing the test case will be stored. In this way, data analyzer 218 will be able to locate the data for a particular test case to analyze and present to a tester in the desired form.

Field 1014 gives the URL—or network address—for the application under test. This information could be identified by using the name for a particular machine that was previously set-up by the human tester. Field 1016 gives the URL—or network address—for a server to use as a test engine. Again, the server could be identified by using the name for a particular machine that was previously set-up by the human tester. The screen displayed in FIG. 10 is used for an embodiment of the invention where all test simultaneously executing copies of the client test code are run on a single machine. If test system 110 includes multiple test engines and automatically schedules execution of test code as described in conjunction with FIG. 4 above, then field 1016 is not required.

Field 1018 gives the maximum number of concurrent users to be simulated at one time during the execution of the test case. Field 1020 allows the user to specify the rate at which the number of simultaneous users will be simulated during a test. In the example of FIG. 10, the test case will be completed after 100 users have been simulated simultaneously and the number of simultaneous users will increase by 10 each time the test code is run. For the examples given here, 10 copies of the client test code shown in FIG. 9 will first be executed simultaneously. Then 20 copies of that test code will be executed simultaneously. The test code will be repeated for 30, 40, 50, 60, 70, 80, 90 and 100 simultaneous users before the test case is completed.

Figure 11:
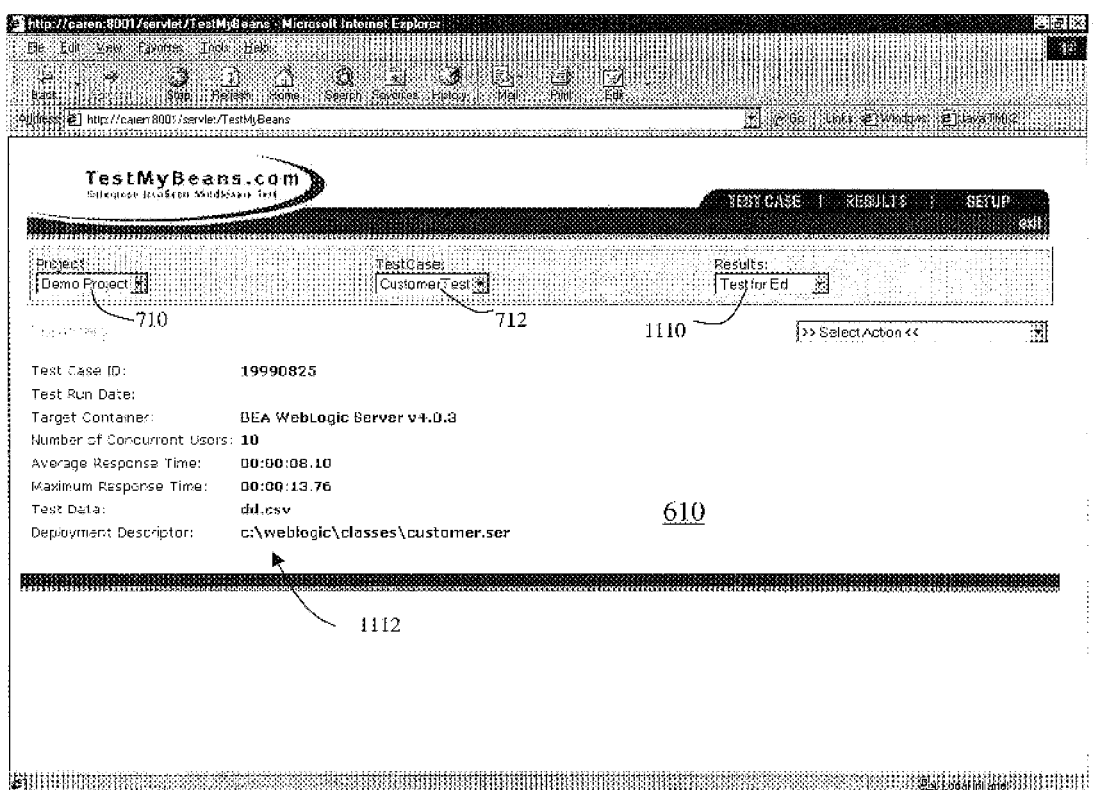
FIG. 11 illustrates a user interface of test system 110 during a phase for reviewing the results of a test case in tabular format.

After the test case has been run, the tester can view and analyze the results. The human tester can access the functions of the test system 110 that display and analyze results by selecting the RESULTS tab from tabs 616. FIG. 11 shows a page displayed when the RESULTS tab is selected. The page shown in FIG. 11 is for when the tester has requested to see summary data through use of menu field 622.

Fields 710 and 712 are also present on the page shown in FIG. 11. This information is used by the test system to locate the appropriate data to display. In addition, there is a field 1110 that allows the user to enter the name of the results file to display. As described in conjunction with FIG. 10, the user specifies in field 1012 the name of a results file to hold the results of a particular run of a test case. The name of the results file for desired run of the test is entered in filed 1110.

FIG. 11 shows that window 610 contains a region 1112 that lists the results of a run of a particular test case in summary fashion. Part of the information in region 1112 is simply a display of information input by the tester when editing or running the test case. For example, the target container, or the container 130 of application under test 114 is listed. The maximum number of concurrent users simulated during the test is also displayed. The file containing the test data use for the run of the test case that generated the results is also displayed as is the deployment descriptor. These values are displayed for ease of use by the human tester.

Region 1112 also includes information that was developed by data analyzer 218 from the data gathered for the specified run of the test case. In FIG. 11, the pieces of information that are displayed are the average response time and the maximum response time. As described above, as a test case runs, the start and stop times of the execution of the test code is recorded in log 216. When the test code is run multiple times, each time simulating a different number of users, the start and stop time is recorded for each number of users. Data analyzer can determine the response time by simply computing the difference between the start and stop times. Once values are determined, they can be averaged or the maximum can be identified.

Figure 12:
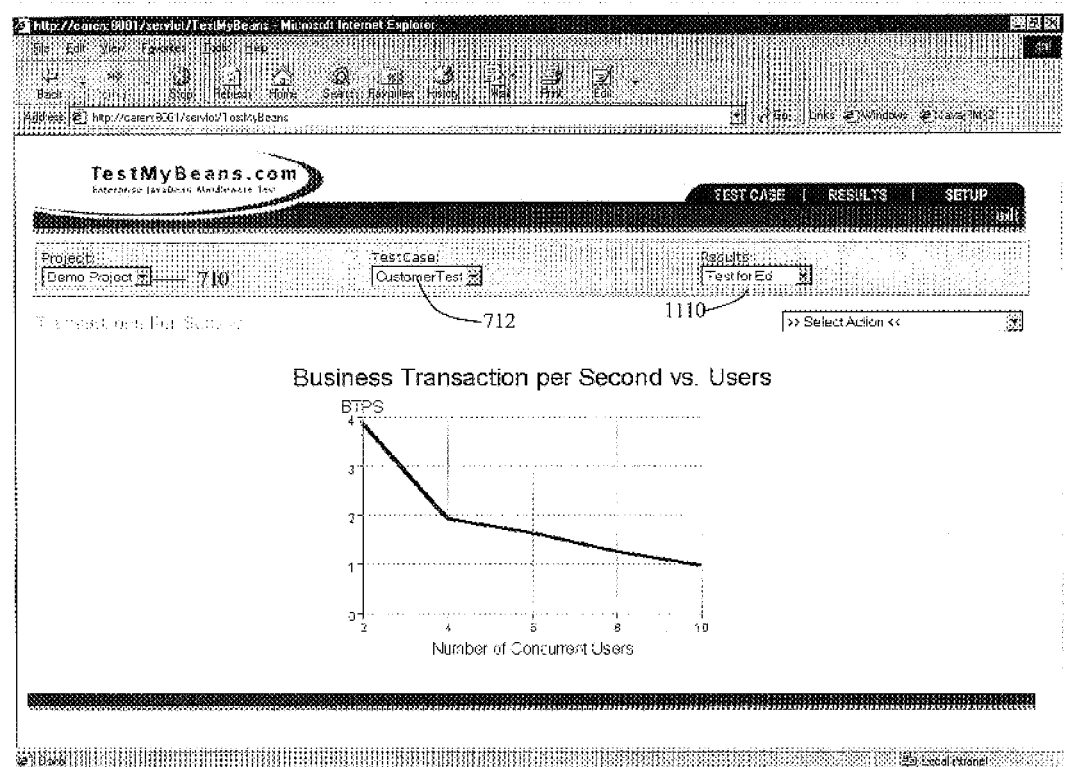
FIG. 12 illustrates a user interface of test system 110 during a phase for reviewing the results of a test case in graphical format.

FIG. 12 shows a different page that can be selected by the user to see the results in graphical format. As above, fields 710, 712 and 1110 allow the user to specify which run of a particular test case is used to create the results. The graphical display in FIG. 12 is a graph showing numbers of transactions per second as the dependent variable with the number of simultaneous users as the independent variable. As described above, the information needed to compute the data values for this graph is stored in log 216 after the test case is run and data analyzer 218 can retrieve it. For creation of the graph in FIG. 12, transactions per second was defined as the average number of methods executed per second per user. This value is essentially the reciprocal of response time.

Figure 13:
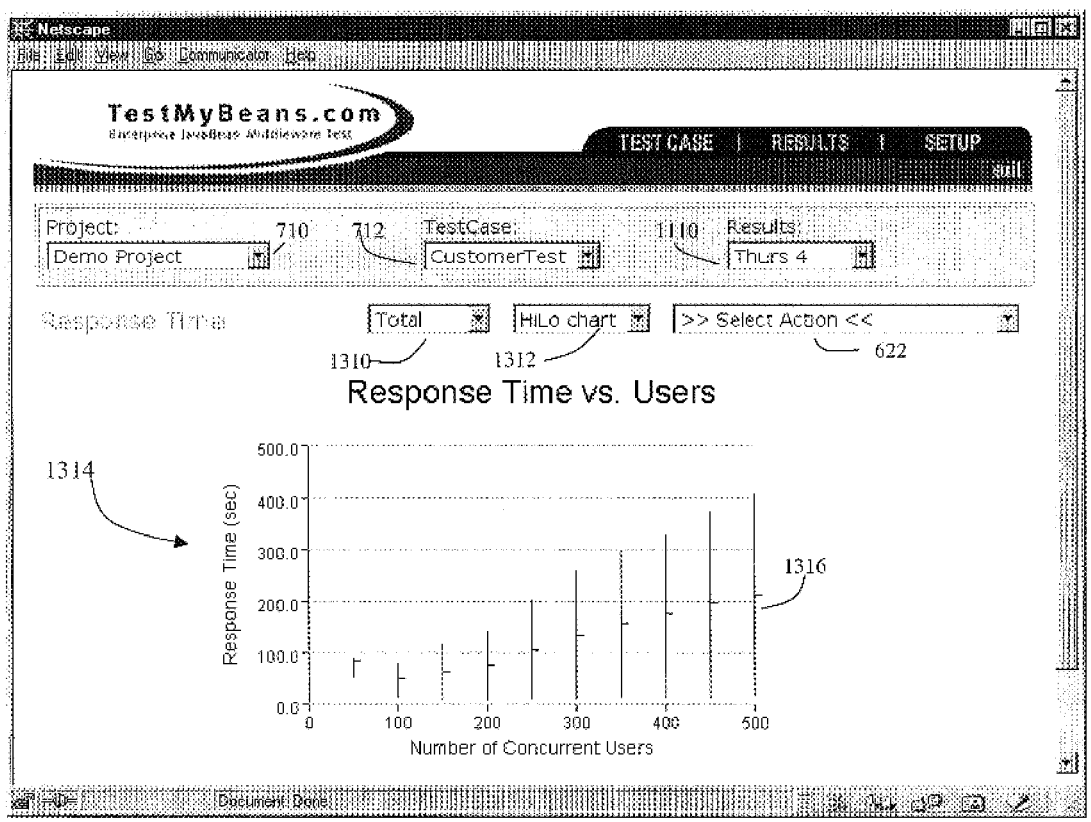
FIG. 13 illustrates a user interface of test system 110 during a phase for reviewing the results of a test case in an alternative graphical format.

FIG. 13 shows a screen useful for displaying results to a human tester in a slightly different embodiment. As with FIG. 12, the screen display in FIG. 12 is accessed when the "RESULTS" tab is selected. Also like in FIG. 12, the page shown in FIG. 13 includes fields 710, 712 and 1110 that allow the human tester to specify which results are to be displayed.

The page shown in FIG. 13 includes an alternative way for the user to specify the format of the display. The screen in FIG. 13 includes menu fields 1310 and 1312. Menu field 1310 allows the tester to specify the manner in which response time is to be calculated. In FIG. 13, a value of "total" has been selected in field 1310. As described above, the "total" response time is measured as the time from first access of a bean until all methods of the bean have been exercised. Other choices in menu field 1310 allow a tester to specify that result be displayed for different measures of response time. As described above, the presently preferred embodiment can measure response time just on the start up time or response time for individual methods or for get-functions and set-functions.

Field 1312 allows a user to specify the format of the display. In FIG. 13, the display is in HiLo format. In this format, results are displayed as bars, such as bar 1316. Each bar spans from the fastest response time to the slowest response time. A tick mark showing the average is also included in the illustration of FIG. 13. Other choices in menu field 1312 would, for example, allow the human tester to see results in a line chart format as in FIG. 12 or in tabular format.

Figure 14:
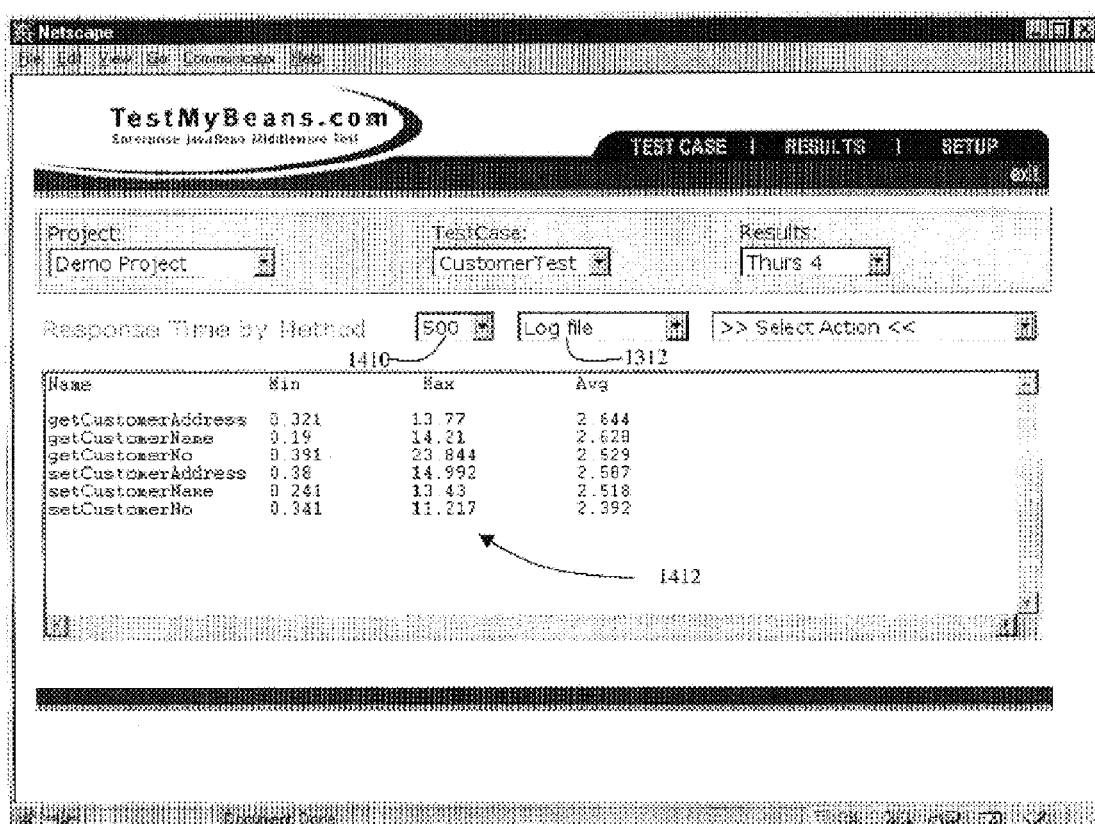
FIG. 14 illustrates a user interface of test system 110 during a phase for reviewing the results of a test case in a tabular format.

Turning to FIG. 14, results in a tabular format are shown. Field 1312 indicates that the display format of "Log File" has been selected. This format corresponds to the list shown in region 1412. The list contains a column for the name of the methods in the bean being tested. In this example, the data shown for each method reveals the minimum, maximum and average execution time for that method.

As described above, test system 110 measures response time at various load conditions. The displayed data represents response times at a particular load condition. Thus, to make the list, the tester must specify the load condition for which data is to be displayed. To allow this selection to be made, the page displayed in FIG. 14 contains a field 1410. In this field, a user can enter the load condition for which data is to be displayed. In this example, the human tester has entered a value of 500, indicating that 500 threads executing the test code were initiated in order to obtain the displayed data.

Having described the structure of test system 110 and giving examples of its application, several important features of the test system 110 can be seen. One feature is that information about the performance of an application under test can be easily obtained, with much of the data being derived in an automated fashion. A software developer could use the test system to find particular beans that are likely to be performance bottlenecks in an application. The developer could then rewrite these beans or change their deployment descriptors. For example, one aspect of the deployment descriptor indicates the number of copies of the bean that are to be instantiated within application under test 114. The developer could increase the number of instantiations of a bean if that bean is the bottleneck.

The test system described herein provides an easy and accurate tool to test EJBs for scalability. It creates a user specified number of virtual users that call the EJB while it is deployed on the applications server. The tool does this by inspecting the EJB under test and automatically generating a client test program, using either rules based data or data supplied by an a human tester, and then multithreading the client test program to drive the EJB under test. The result is a series of graphs reporting on the performance versus the number of users, which provide useful information in an easy to use format.

Another feature of the invention is that the tests are run without requiring changes in the application under test or even the installation of special test agents on the server containing the software under test. The generated test code 516 exercises the bean in the application under test using remote procedure calls.

Another feature of the described embodiment of test system 110 is that it is scalable. To increase the number of tests that could simultaneously be run or the size of the tests that could be run, more test engines could be added. Likewise, more code generators could be added to support the simulation of a larger number of simultaneous users. The specific number of copies of each component is not important to the invention. The actual number of each component in any given embodiment is likely to vary from installation to installation. The more users an application is intended to support, the more test engines are likely to be required.

Another feature of the described embodiment is that testing is done on the simplest construct in the application under test—the beans in the illustrated example. There are two benefits to this approach. First, it allows tests to be generated very simply, with minimal human intervention. Second, it allows a software developer to focus in on the point of the software that needs to be changed or adjusted in order to improve performance.

It should be appreciated that displays of specific kinds of information have been described. Various other analyses might be performed. It was described that response times and error rates as a function of load could be graphed for display to a human tester for further analysis. One enhancement that might be made to test system 110 is that the data analyzer 218 could be programmed to perform further analysis. It has been recognized that, as the load increases, there is often some point at which the performance of the system drastically changes. In some instances, the time to complete a transaction drastically increases. A drastic increase in transaction processing time indicates that the system was not able to effectively handle the load. However, a decrease in processing time can also indicate the load limit was reached. Sometimes, a system under test will respond with an error message more quickly than it would take to generate a correct response. Thus, if the only parameter being tracked is response time, a decrease in processing time as a function of load can also signal that the maximum load has been exceeded. Of course, an increase in errors or error rate can also signal that the maximum load was exceeded. Data analyzer 218 could be used to identify automatically a maximum load for a particular test case. By running multiple test cases, each test case focusing on a different bean, test system 110 could automatically determine the bean that is the performance bottleneck and could also assign a load rating to application under test 114.

Having described one embodiment, numerous alternative embodiments or variations might be made. For example, it was described that test system 110 automatically generates test code to exercise beans that follow a pattern for database access. These beans are sometimes called "entity beans." In general, there will be other beans in an application that perform computations on the data or that control the timing of the execution of the entity beans. These beans are sometimes called "session beans." Session beans are less likely to follow prescribed programming patterns that make the generation of test code for entity beans simple. As a result, the automatically generated test code for session beans might not fully test those beans. In the described embodiment, it is expected that the human tester supply test code to test session beans where the automatically generated tests are inadequate.

One possible modification to the described embodiment is that the completeness of tests for session beans might be increased. One way to increase the accuracy of tests for session beans would be to capture data about the execution of those beans during actual operation of the application under test 114. This data could allow an automated system to determine things like appropriate data values, which might then be used to build a data table. Or, the captured data could allow the automated system to determine the order in which a session bean accesses other session beans or entity beans to create a realistic test.

Also, as described, test code is generated to test a particular bean, which is a simple construct or "component" of the application under test. The testing could focus on different constructs, such as specific methods in a bean. Test code could be generated to test specific methods within beans. Or, it was described that the system records start and stop time of the execution of the test code. The times of other events could be recorded instead or in addition. For example, start and stop times of individual methods might be recorded, allowing performance of individual methods to be determined.

Alternatively, the complexity of the constructs being tested could be increased. Multiple beans might be tested simultaneously to determine interactions between beans. For example, multiple test cases might be executed at the same time, with one test case exercising a specified instances of one bean and a different test case exercising a specified number of instances of a second bean.

As another example of a possible variation, it was described that a human tester can insert code into a template to do such things as put the application under test into a predictable state. Lines of code might be inserted directly, for example by the user simply typing the lines of code. Or, the tester might insert a "tag" into the template. The tag would identify a code segment stored elsewhere within the test system. In this way, the same code segment could be included at multiple places in the template or in multiple templates.

As another example of possible variations, the number of templates used to construct test code might be varied. One possibility is that each template contains all of the steps needed to initialize, run and terminate a test. Thus, test code would be created by filling in a single template. Alternatively, each template might contain only the steps needed to perform one function, such as initialization, testing or termination. In this implementation, test code would be created by stringing together multiple templates.

Also, it was described that in running a test that a number of simultaneous users is "synchronized". Simultaneous users are simulated by synchronizing copies of the test code on different servers and on the same server. The term "synchronized" should not be interpreted in so limited a way as to imply that multiple copies are each performing exactly the same function at exactly the same time. Thus, when described herein that execution is synchronized, all that is required is that each copy of the code is making requests of the application under test during the window of time when the test is being executed. Some copies of the code will likely start execution sooner or end sooner than the others. However, as long as there is overlap in the timing of execution, the test programs can be said to be synchronized or running concurrently.

As a further variation, it was described that the test system 110 provides outputs indicating the performance of an application under test as a function of load. These outputs in graphical or tabular form can be used by an application developer to identify a number of concurrent users at which problems with the application are likely to be encountered. Potential problems are manifested in various ways, such as by a sudden change in response time or error rate as a function of load. Test system 110 could readily be programmed to automatically identify patterns in the output indicating these problem points.

Another useful modification would allow test system 110 to aid in identifying settings for various parameters in the deployment descriptor. As described above, the deployment descriptor for a bean identifies parameters such as memory usage and a "pooling number" indicating the number of instances of a bean that are created at the initialization of an application. These and other settings in the deployment descriptor might have an impact on the performance time and maximum load that an application could handle. One use of the test system described above is that it allows a test case to be repeated for different settings in the deployment descriptor. A human tester can analyze changes in performance for different settings in the deployment descriptor. However, test system 110 could be programmed to automatically edit the deployment descriptor of a bean by changing parameters affecting pooling or memory usage. Test system 110 could then automatically gather and present data showing the impact of a deployment descriptor on performance of an application.

Even higher levels of automation could be achieved by test system 110. For example, test system 110 might test the beans in an application and analyze the results of testing each bean. Test system 110 might identify the bean or beans that reflect performance bottlenecks (i.e. that exhibited unacceptable response times for the lowest numbers of simultaneous users). Then, test system 110 could run tests on those beans to find settings in the deployment descriptors that would balance the performance of the beans in the application (i.e. to adaptively adjust the settings in the deployment descriptors so that the bottleneck beans performed no worse than other beans.)

It should also be appreciated that computer technology is rapidly evolving and improved or enhanced versions of the hardware and software components making up the application under test and the test system are likely to become available. It should also be appreciated that the description of one device in a class is intended to be illustrative rather than limiting and that other devices within the same class might be substituted with ordinary skill in the art. For example, the application under test was described in the context of a conventional application accessed through a client on a PC using a web browser as a graphical user interface. It should be appreciated, though, that if the clients are intended to be household appliances with microcontrollers, a different interface might be readily substituted for the graphical user interface.

Also, it was described that FIG. 11 shows summary data of a test after execution is completed. It will be appreciated, though, that data on a test case execution might be displayed to a human tester while a test is in process. For example, the summary screen might contain a field that shows the percentage of the test case that is completed. This value would update as the test runs. Likewise, the values for average and maximum response time could be updated as the data is gathered.

Also, it was described that the objects being tested are EJBs, which are written in the Java language. The same techniques are equally applicable to applications having components implemented in other languages. For example, applications written according to the COM standard might be written in Visual Basic and applications written for the CORBA standard might be written in C++.

Regardless of the specific language used, these standards are intended to allow separately developed components to operate together. Thus, each must provide a mechanism for other applications, such as test system 110, to determine how to access the methods and properties of their components. However, there could be differences in the specific commands used to access components.

In one embodiment, code generator 212 is implemented in a way that will make it easy to modify for generating test code for applications written in a different language. Specifically, code generator 212 stores intermediate results as a symbol table that is independent of the specific language used to program the application under test. The symbol table lists methods and properties for the component being tested. When to access these methods and what data to use for a particular test and what kinds of data to record can be determined from the information in the symbol table and input from the user. Thus, much of the functioning of code generator 212 is independent of the specific language used to implement the application under test.

In this way, the language specific aspects of code generator 212 are easily segregated and represent a relatively small part of the code generator 212. In particular, language specific information is needed to access the application under test to derive the information for the symbol table. Language specific information is also needed to format the generated client test code. But, it is intended that these parts of code generator 212 could be replaced to allow test system 110 to test applications written in other languages. Also, it is possible that test system 110 will contain multiple versions of the language specific parts and the user could specify as an input the language of the application under test.

APPENDIX 1

(A Script)
Generate new script

```
0 = generateStandardPreamble
1 = generateText(Java EJB imports,Common.ini,random,vendor.csv)
2 = generateText(com.testmybeans.vendor.Vendor imports,ctor.ini,
random,vendor.csv)
3 = generateText(TestThread header,Common.ini,random,vendor.csv)
4 = generateText(TestThread.run implementation,Common.ini,random,
vendor.csv)
5 = generateText(com.testmybeans.vendor.Vendor
create,com.testmybeans.vendor.Vendor.ctor.ini,random,vendor.csv)
6 = generateMethod(timingGetSet)
7 = generateText(Bean end create,Common.ini,random,vendor.csv)
8 = generateText(WebLogic getInitialContext,AppServer.ini,
random,vendor.csv)
9 = generateText(Close log,Common.ini,random,vendor.csv)
10 = generateText(Log to disk,Common.ini,random,vendor.csv)
11 = generateStandardTrailer
```

APPENDIX 2

(A Template)

```
[Java EJB imports]
//[Java EJB imports]
package com.testmybeans.client;
import javax.naming.InitialContext;
import javax.naming.Context;
import javax.naming.NamingException;
import java.rmi.RemoteException;
importjava.util.*;
importjava.io.*;
[Hello imports]
//[Hello imports]
import com.softbridge.hello.HelloHome;
import com.softbridge.hello.Hello;
import com.softbridge.hello.HelloPK;
[TestThread header]
//[TestThread header]
public class $system.programName$ extends Thread
{
int tempInt=0;
Double tempDouble=new Double(0.0);
Float tempFloat=new Float(0.0);
short tempShort=0:
long tempLong=0;
String tempString=" ";
long sTime=0;
long sStartTime=0;
int m__instanceNumber = 0;
static String m__urlName = null;
String threadNumber=" ";
public $system.programName$(int inst, String url)
{
```

APPENDIX 2-continued (A Template)

```
m_instanceNumber = inst;
m_urlName = url;
threadNumber=Integer.toString(m_instanceNumber);
//System.out.println("Starting Instance: " + m_instanceNumber);
}
[TestThread.run implementation]
//[TestThread.run implementation]
public void run( )
{
sTime = new Date( ).getTime( );
sStartTime=sTime;
logError("elapsedStart", Long.toString(new Date( ).getTime( )), " ", " ");
[Bean end create]
//[Bean end create]
}
catch (Exception e)
{
logError("except", "beanMethods", e.toString( ), " ");
}
finally
{
try
{
closeLog( );
h.remove ( );
h = null;
}
catch (Exception e)
{
logError("except", "closeHome", e.toString( ), " ");
}
}
}
[Bean end findByPrimaryKey]
//[Bean end findByPrimaryKey]
}
catch (Exception e)
{
logError("except", "beanMethods", e.toString( ), " ");
}
finally
{
try
{
closeLog( );
h = null;
}
catch (Exception e)
{
logError("except", "closeHome", e.toString( ), " ");
}
}
}
[Log to disk]
//[Log to disk]
public void logError(String key, String functionName,
String expected, String actual)
{
try
{
String elapsedTime = Long.toString(new Date( ).getTime( ) - sTime);
com.testmybeans.client.cThreadWriter.write(key + "~" +
functionName + "~" +
expected + "~" +
actual + "~" +
elapsedTime + "~" + threadNumber);
}
catch (Exception e)
{
System.out.printin("IOException: " + e.getMessage( ));
System.exit(1);
}
}
[Close log]
//[Close log]
public void closeLog( )
{
sTime=sStartTime;
logError("elapsedEnd", Long.toString(new Date( ).getTime( )), " ", " ");
}
```

APPENDIX 3

(Test Code)

```
//
//Bean under test: com.testmybeans.vendor.Vendor
//Author: TestMyBeans Code Generator v0.8
//Creation Date: Fri Dec 10 16:53:15 EST 1999
//Copyright (c) 1999 TestMyBeans, Inc. All rights reserved.
//
//[Java EJB imports]
package com.testmybeans.client;
import javax.naming.InitialContext;
import javax.naming.Context;
import javax.naming.NamingException;
import java.rmi.RemoteException;
import java.util.*;
import java.io.*;
//[TestThread header]
public class invoice extends Thread
    {
    int tempInt=0;
    Double tempDouble=new Double(0.0);
    Float tempFloat=new Float(0.0);
    short tempShort=0;
    long tempLong=0;
    String tempString=" ";
    long sTime=0;
    long sStartTime=0;
```

APPENDIX 3-continued (Test Code)

```
    int m_instanceNumber = 0;
    static String m_urlName = null;
    String threadNumber=" ";
    public invoice(int inst, String url)
        {
        m_instanceNumber = inst;
        m_urlName = url;
        threadNumber=Integer.toString(m_instanceNumber);
        //System.out.println("Starting Instance: " + m_instanceNumber);
        }
    //[TestThread.run implementation]
    public void run( )
        {
        sTime = new Date( ).getTime( );
        sStartTime=sTime;
        logError("elapsedStart", Long.toString(new Date( ).getTime( )), " ", " ");
        //[com.testmybeans.vendor.Vendor create]
        int msValue = (-100000) * ((int) new Date ( ).getTime ( )) %
(Integer.MAX_VALUE/100000);
        int arg0 = m_instanceNumber + msValue;
        com.testmybeans.vendor.Vendor h = null;
        try
            {
            Context jndi = getInitialContext( );
            com.testmybeans.vendor.VendorHome home =
(com.testmybeans.vendor.VendorHome) jndi.lookup("OEVendor");
            h = home.create(arg0);
            }
        catch (Exception e)
            {
            System.out.println ("com.testmybeans.vendor.VendorHome" + e.toString( ));
            }
        try
            {
            //-----------com.testmybeans.vendor.Vendor(setCost) -------------
            try
                {
                sTime = new Date( ).getTime( );
                h.setCost(568);
                logError("SetTime", "setCost", "568", " ");
                }
            catch (Exception e)
                {
                logError("except", "setCost", e.toString( ), " ");
                }
            //-----------com.testmybeans.vendor.Vendor(setName) -------------
            try
                {
                sTime = new Date( ).getTime( );
                h.setName("qkgthfpw");
                logError("setTime", "setName", "qkgthfpw", " ");
                }
            catch (Exception e)
                {
                logError("except", "setName", e.toString( ), " ");
                }
            //-----------com.testmybeans.vendor.Vendor(setProduct) -------------
            try
                {
                sTime = new Date( ).getTime( );
                h.setProduct("dpnoolww");
                logError("setTime", "setProduct", "dpnoolww", " ");
                }
            catch (Exception e)
                {
                logError("except", "setProduct", e.toString( ), " ");
                }
            //-----------com.testmybeans.vendor.Vendor(getCost) -------------
            try
                {
                sTime = new Date( ).getTime( );
                if((tempInt = h.getCost( )) != 555)
                    logError("getFailed", "getCost", "555", Integer.toString(tempInt));
                else
                    logError("getPassed", "getCost", "555", Integer.toString(tempInt));
                }
            catch (Exception e)
```

APPENDIX 3-continued (Test Code)

```
                }
                logError("except", "getCost", e.toString( ), " ");
                }
            //-----------com.testmybeans.vendor.Vendor(getName) -------------
            try
                {
                sTime = new Date( ).getTime( );
                if(!(tempString = h.getName( )).equals("icgnhoje"))
                logError("getFailed", "getName", "icgnhoje", tempString);
                else
                logError("getPassed", "getName", "icgnhoje", tempString);
                }
            catch (Exception e)
                {
                logError("except", "getName", e.toString( ), " ");
                }
            //-----------com.testmybeans.vendor.Vendor(getProduct) -------------
            try
                {
                sTime = new Date( ).getTime( );
                if(!(tempString = h.getProduct( )).equals("zwlhjoxk"))
                logError("getFailed", "getProduct", "zwlhjoxk", tempString);
                else
                logError("getPassed", "getProduct", "zwlhjoxk", tempString);
                }
            catch (Exception e)
                {
                logError("except", "getProduct", e.toString( ), " ");
                }
            //[Bean end create]
            }
        catch (Exception e)
            {
            logError("except", "beanMethods", e.toString( ), " ");
            }
        finally
            {
            try
                {
                closeLog( );
                h.remove ( );
                h = null;
                }
            catch (Exception e)
                {
                logError("except", "closeHome", e.toString( ), " ");
                }
            }
        }
    //[WebLogic getInitialContext]
    public static Context getInitialContext( ) throws javax.naming.NamingException
        {
        try
            {
            Properties p = new Properties( );
            p.put(Context.INITIAL_CONTEXT_FACTORY,
"weblogic.jndi.T3InitialContextFactory");
            p.put(Context.PROVIDER_URL, m_urlName);
            return new javax.naming.InitialContext(p);
            }
        catch (Exception e)
            {
            System.out.println("getInitialContext Exception: "+e);
            System.exit(1);
            }
        return null;
        }
    //[Close log]
    public void closeLog( )
        {
        sTime=sStartTime;
        logError("elapsedEnd", Long.toString(new Date( ).getTime( )), " ", " ");
        }
    //[Log to disk]
    public void logError(String key, String functionName, String expected, String actual)
        {
        try
```

APPENDIX 3-continued (Test Code)

```
            {
            String elapsedTime = Long.toString(new Date( ).getTime( ) - sTime);
            com.testmybeans.client.CThreadWriter.write(key + "~" + functionName + "~" +
expected + "~" + actual + "~" + elapsedTime + "~" + threadNumber);
            }
        catch (Exception e)
            {
            System.out.println("IOException: " + e.getMessage( ));
            System.exit(1);
            }
        }
    }
//
//Bean under test: com.testmybeans.vendor.Vendor
//Author: TestMyBeans Code Generator v0.8
//Creation Date: Fri Dec 10 16:53:15 EST 1999
//Copyright (c) 1999 TestMyBeans, Inc. All rights reserved.
//
//[Java EJB imports]
package com.testmybeans.client;
import javax.naming.InitialContext;
import javax.naming.Context;
import javax.naming.NamingException:
import java.rmi.RemoteException;
import java.util.*;
import java.io.*;
//[TestThread header]
public class invoice extends Thread
    {
    int tempInt=0;
    Double tempDouble=new Double(0.0);
    Float tempFloat=new Float(0.0);
    short tempShort=0;
    long tempLong=0;
    String tempString=" ";
    long sTime=0;
    long sStartTime=0;
    int m_instanceNumber = 0;
    static String m_urlName = null;
    String threadNumber=" ";
    public invoice(int inst, String url)
        {
        m_instanceNumber = inst;
        m_urlName = url;
        threadNumber=Integer.toString(m_instanceNumber);
        //System.out.println("Starting Instance: " + m_instanceNumber);
        }
    //[TestThread.run implementation]
    public void run( )
        {
        sTime = new Date( ).getTime( );
        sStartTime=sTime;
        logError("elapsedStart", Long.toString(new Date( ).getTime( )), " ", " ");
        //[com.testmybeans.vendor.Vendor create]
        int msValue = (-100000) * ((int) new Date ( ).getTime ( ) %
(Integer.MAX_VALUE/100000);
        int arg0 = m_instanceNumber + msValue;
        com.testmybeans.vendor.Vendor h = null;
        try
            {
            Context jndi = getInitialContext( );
            com.testmybeans.vendor.VendorHome home =
(com.testmybeans.vendor.VendorHome) jndi.lookup("OEVendor");
            h = home.create(arg0);
            }
        catch (Exception e)
            {
            System.out.println ("com.testmybeans.vendor.VendorHome" + e.toString( ));
            }
        try
            {
            //-----------com.testmybeans.vendor.Vendor(setCost)-------------
            try
                {
                sTime = new Date( ).getTime( );
                h.setCost(568);
                logError("SetTime", "setCost", "568", " ");
```

APPENDIX 3-continued (Test Code)

```
            }
        catch (Exception e)
            {
            logError("except", "setCost", e.toString( ), " ");
            }
        //-----------com.testmybeans.vendor.Vendor(setName) -------------
        try
            {
            sTime = new Date( ).getTime( );
            h.setName("qkgthfpw");
            logError("setTime", "setName", "qkgthfpw", " ");
            }
        catch (Exception e)
            {
            logError("except", "setName", e.toString( ), " ");
            }
        //-----------com.testmybeans.vendor.Vendor(setProduct) -------------
        try
            {
            sTime = new Date( ).getTime( );
        h.setProduct("dpnoolww");
        logError("setTime", "setProduct", "dpnoolww", " ");
        }
    catch (Exception e)
        {
        logError("except", "setProduct", e.toString( ), " ");
        }
    //-----------com.testmybeans.vendor.Vendor(getCost) -------------
    try
        {
        sTime = new Date( ).getTime( );
        if((tempInt = h.getCost( )) != 555)
        logError("getFailed", "getCost", "555", Integer.toString(tempInt));
        else
        logError("getPassed", "getCost", "555", Integer.toString(tempInt));
        }
    catch (Exception e)
        {
        logError("except", "getCost", e.toString( ), " ");
        }
    //-----------com.testmybeans.vendor.Vendor(getName) -------------
    try
        {
        sTime = new Date( ).getTime( );
        if(!(tempString = h.getName( )).equals("icgnhoje"))
        logError("getFailed", "getName", "icgnhoje", tempString);
        else
        logError("getPassed", "getName", "icgnhoje", tempString);
        }
    catch (Exception e)
        {
        logError("except", "getName", e.toString( ), " ");
        }
    //-----------com.testmybeans.vendor.Vendor(getProduct) -------------
    try
        {
        sTime = new Date( ).getTime( );
        if(!(tempString = h.getProduct( )).equals("zwlhjoxk"))
        logError("getFailed", "getProduct", "zwlhjoxk", tempString);
        else
        logError("getPassed", "getProduct", "zwlhjoxk", tempString);
        }
    catch (Exception e)
        {
        logError("except", "getProduct", e.toString( ), " ");
        }
    //[Bean end create]
    }
catch (Exception e)
    {
    logError("except", "beanMethods", e.toString( ), " ");
    }
finally
    {
    try
        {
        closeLog( );
```

APPENDIX 3-continued (Test Code)

```
            h.remove ( );
            h = null;
        }
        catch (Exception e)
        {
            logError("except", "closeHome", e.toString( ), " ");
        }
    }
}
//[WebLogic getInitialContext]
public static Context getInitialContext( ) throws javax.naming.NamingException
{
    try
    {
        Properties p = new Properties( );
        p.put(Context.INITIAL_CONTEXT_FACTORY,
"weblogic.jndi.T3InitialContextFactory");
        p.put(Context.PROVIDER_URL, m_urlName);
        return new javax.naming.InitialContext(p);
    }
    catch (Exception e)
    {
        System.out.println("getInitialContext Exception: "+e);
        System.exit(1);
    }
    return null;
}
//[Close log]
public void closeLog( )
{
    sTime=sStartTime;
    logError("elapsedEnd", Long.toString(new Date( ).getTime( )), " ", " ");
}
//[Log to disk]
public void logError(String key, String functionName, String expected, String actual)
{
    try
    {
        String elapsedTime = Long.toString(new Date( ).getTime( ) - sTime);
        com.testmybeans.client.CThreadWriter.write(key + "~" + functionName + "~" +
expected + "~" + actual + "~" + elapsedTime + "~" + threadNumber);
    }
    catch (Exception e)
    {
        System.out.println("IOException: " + e.getMessage( ));
        System.exit(1);
    }
}
}
```

What is claimed is:

1. A method of generating test code for testing of a software application under test, the software application under test being of the type having a plurality of software components within a container, the method comprising the steps of:

a) generating a request to the container whereby the container responds with interface information associated with a software component, wherein the interface information includes at least one component method and at least one property associated with the at least one component method;

b) automatically generating data values in a range of values and having a data type permitted by the at least one property; and c) generating client test code for testing the software application under test, said client test code including commands to exercise the at least one component method, wherein the client test code includes the automatically generated data values as inputs to the at least one component method, and wherein the client test code accesses the at least one component method with an interface provided by the container.

2. The method of claim 1 wherein the software application under test communicates with a database and the at least one component method sets values in the database.

3. The method of claim 1 wherein the software application under test communicates with a database and the at least one component method gets values from the database.

4. The method of claim 1 wherein the software application under test communicates with a database and the at least one component method creates records in the database.

5. The method of claim 1 wherein the software application under test communicates with a database and the at least one component method finds records in the database.

6. The method of claim 1, wherein the software application under test includes at least one software component associated with a business software application.

7. A method of generating test code for testing a software component within a software application under test, each software component having a plurality of component methods and properties associated therewith, the method comprising:

a) accessing a reflection interface associated with the software component;
b) using the reflection interface to determine component methods associated with the software component; and
c) generating test code for testing the software component within the software application under test, said test code including commands that exercise the component methods.

8. The method of claim 7 wherein:
a) the step of using the reflection interface includes using the reflection interface to determine properties associated with the software component; and
b) the step of generating test code for testing the software component within the software application under test includes using the properties of the software component to determine allowable ranges of values for inputs to the component methods and selecting values within the allowable ranges.

9. The method of claim 7, wherein the software application under test includes at least one software component associated with a business software application.

* * * * *